US012037300B2

(12) United States Patent
Staal et al.

(10) Patent No.: US 12,037,300 B2
(45) Date of Patent: Jul. 16, 2024

(54) USE OF A CATION SOURCE TO PREVENT DECOMPOSITION OF (THIO)PHOSPHORIC ACID TRIAMIDE UREASE INHIBITORS WHEN A PHOSPHORUS-CONTAINING FERTILIZER IS PRESENT

(71) Applicant: BASF SE, Ludwigshafen am Rhein (DE)

(72) Inventors: Maarten Staal, Limburgerhof (DE); Johannes Reuvers, Hohen-Suelzen (DE); Wolfram Zerulla, St Martin (DE); Markus Schmid, Deidesheim (DE); Uwe Thiel, Bensheim (DE)

(73) Assignee: BASF SE, Ludwigshafen am Rhein (DE)

( * ) Notice: Subject to any disclaimer, the term of this patent is extended or adjusted under 35 U.S.C. 154(b) by 684 days.

(21) Appl. No.: 16/088,920

(22) PCT Filed: Mar. 23, 2017

(86) PCT No.: PCT/IB2017/051675
§ 371 (c)(1),
(2) Date: Sep. 27, 2018

(87) PCT Pub. No.: WO2017/168288
PCT Pub. Date: Oct. 5, 2017

(65) Prior Publication Data
US 2019/0112241 A1 Apr. 18, 2019
US 2020/0216368 A9 Jul. 9, 2020

(30) Foreign Application Priority Data
Apr. 1, 2016 (EP) .................................... 16163525
Oct. 24, 2016 (EP) .................................... 16195247

(51) Int. Cl.
*C05C 9/00* (2006.01)
*C05B 7/00* (2006.01)
*C05G 3/90* (2020.01)
*C05G 5/30* (2020.01)

(52) U.S. Cl.
CPC .................. *C05G 3/90* (2020.02); *C05B 7/00* (2013.01); *C05C 9/00* (2013.01); *C05G 5/30* (2020.02)

(58) Field of Classification Search
CPC .... C05C 1/00; C05C 5/04; C05C 9/00; C05G 5/20; C05G 3/90; C05G 5/30; C05B 7/00
See application file for complete search history.

(56) References Cited
U.S. PATENT DOCUMENTS

| 4,530,714 | A | 7/1985 | Kolc et al. |
| 5,352,265 | A | 10/1994 | Weston et al. |
| 5,656,571 | A | 8/1997 | Miller et al. |
| 5,698,003 | A | 12/1997 | Omilinsky et al. |
| 7,182,537 | B2 | 2/2007 | Policicchio et al. |
| 8,888,886 | B1 | 11/2014 | Whitehurst et al. |
| 2004/0031303 | A1* | 2/2004 | Whitehurst ............... C05C 9/00 71/28 |
| 2010/0218575 | A1 | 9/2010 | Wissemeier et al. |
| 2011/0154874 | A1 | 6/2011 | Rahn et al. |
| 2013/0145806 | A1* | 6/2013 | Iannotta ................... C05B 15/00 71/27 |
| 2014/0037570 | A1* | 2/2014 | Whitehurst ............. C05C 9/005 424/76.6 |
| 2014/0360239 | A1* | 12/2014 | Kleine-Kleffmann ....................... C07C 273/02 71/28 |
| 2016/0332929 | A1* | 11/2016 | McKnight ................ C05G 3/90 |

FOREIGN PATENT DOCUMENTS

| CN | 101723751 A | 6/2010 |
| DE | 10317895 A1 | 11/2004 |
| DE | 102012025141 A1 | 6/2014 |
| EP | 0055493 A1 | 7/1982 |
| EP | 0119487 A1 | 9/1984 |
| WO | 2012168210 A1 | 12/2012 |
| WO | 2015001457 A2 | 1/2015 |
| WO | WO-2015/062667 A1 | 5/2015 |
| WO | 2016103168 A1 | 6/2016 |
| WO | 2017081183 A1 | 5/2017 |

OTHER PUBLICATIONS

PubChem ("n-Butylphosphorothioic triamide", 2021, accessed from pubchem.ncbi.nlm.nih.gov) (Year: 2021).*
Weyerhaeuser "Arborite CUF EC Product Brochure". <https://www.weyerhaeuser.com/application/files/6715/1019/3444/Arborite_CUF_Brochure.pdf> Dec. 24, 2018 (Year: 2018).*
International Search Report for International Application No. PCT/IB2017/051675, Jun. 26, 2017, 4 pages.
Written Opinion of International Search Authority for International Application No. PCT/IB2017/051675, Jun. 26, 2017, 3 pages.
Ullmanns Enzyklopädie der Technischen Chemie, 4th edition, 1974, vol. 8, pp. 212-213.
Römpps Chemie Lexikon, 8th edition, 1992, p. 3532-3533.
Kiss, S. Simihaian, M. (2002) Improving Efficiency of Urea Fertilizers by Inhibition of Soil Urease Activity, ISBN 1-4020-0493-1, Kluwer Academic Publishers, Dordrecht, The Netherlands.
European Search Report for EP Patent Application No. 16163525.5, Issued on Sep. 29, 2016, 3 pages.

\* cited by examiner

*Primary Examiner* — Jennifer A Smith
(74) *Attorney, Agent, or Firm* — Armstrong Teasdale LLP

(57) ABSTRACT

A cation source to prevent decomposition of a (thio)phosphoric acid triamide is disclosed. A method for preventing decomposition of a (thio)phosphoric acid triamide by adding a cation source is disclosed. A mixture comprising a cation source and a (thio)phosphoric acid triamide is disclosed. A granule coated with a cation source and comprising a fertilizer is disclosed. A composition obtainable by specific processes and comprising a (thio)phosphoric acid triamide, a fertilizer mixture, and a cation source is disclosed.

3 Claims, No Drawings

USE OF A CATION SOURCE TO PREVENT DECOMPOSITION OF (THIO)PHOSPHORIC ACID TRIAMIDE UREASE INHIBITORS WHEN A PHOSPHORUS-CONTAINING FERTILIZER IS PRESENT

CROSS-REFERENCE TO RELATED APPLICATIONS

This application is a U.S. National Phase Application of PCT/IB2017/051675, filed Mar. 23, 2017, which claims the benefit of priority to EP Application No. 16163525.5, filed Apr. 1, 2016, and EP Application No. 16195247.8, filed Oct. 24, 2016, the contents of which are hereby expressly incorporated by reference in their entirety.

The present invention relates to the use of a cation source (1) to prevent decomposition of a (thio)phosphoric acid triamide (2); to a method for preventing decomposition of a (thio)phosphoric acid triamide (2) by adding a cation source (1); to a mixture M comprising a cation source (1) and a (thio)phosphoric acid triamide (2); to a granule G comprising a fertilizer (3a) and/or a P-containing fertilizer (3b), wherein the granule is coated with a cation source (1); and to a composition B comprising a (thio)phosphoric acid triamide (2), a fertilizer mixture (3), and a cation source (1), wherein the composition B is obtainable by specific processes.

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide. In this process, in certain circumstances, gaseous ammonia is emitted to the atmosphere, and is then no longer available in the soil for the plants, thereby lowering the efficiency of fertilization.

It is known that the degree of utilization of the nitrogen when using urea-containing fertilizers can be improved by spreading urea-containing fertilizers together with substances which are able to inhibit or decrease the enzymatic cleavage of urea (for a general review, see Kiss, S. Simihaian, M. (2002) Improving Efficiency of Urea Fertilizers by Inhibition of Soil Urease Activity, ISBN 1-4020-0493-1, Kluwer Academic Publishers, Dordrecht, The Netherlands).

Among the most potent known urease inhibitors are N-alkylthiophosphoric acid triamides and N-alkylphosphoric acid triamides, which are described in EP 0 119 487, for example.

Additionally, mixtures of N-alkylthiophosphoric acid triamides such as N-(n-butyl)thiophosphoric acid triamide (NBPT) and N-(n-propyl)thiophosphoric acid triamide (NPPT) can be used. The mixtures and their preparation are described in US 2010/218575 A1, for example.

These urease inhibitors are described in U.S. Pat. No. 4,530,714, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The urease inhibitor may be incorporated in the urea by, for example, dissolving it into the melt prior to urea granulation or prilling. A process of this kind is described in U.S. Pat. No. 5,352,265, for example. A further option is to apply the urease inhibitor to the urea granules or prills, in the form of a solution, for example. Corresponding processes for application, and suitable solvents, are described in US 2010/218575 A1, for example.

It is known in the art that the storage life of the urease inhibitor is limited in the presence of urea-containing fertilizers. The higher the temperature, the shorter is the storage life. If, for example, urea is stored under tropical conditions, a major part of the urease inhibitor has undergone decomposition, generally, after about four weeks of storage.

In order to address this problem, WO 2015/001457 discloses a composition comprising a (thio)phosphoric acid triamide urease inhibitor in combination with a functionalized amine to increase the stability and storage life of the (thio)phosphoric acid triamides urease inhibitors in the presence of urea-containing fertilizers.

US 2011/0154874 A1 discloses amine-based additives selected from methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether.

The PCT application PCT/IB2015/059864 discloses further amine compounds as additives or coating materials for urea-containing fertilizers.

However, it has been observed that further stability problems of the (thio)phosphoric acid triamide urease inhibitors arise, if the urease inhibitors are not only used together with urea-containing fertilizers, but also with an additional P-containing fertilizer which is preferably a NPK fertilizer, a NP fertilizer, a PK fertilizer, or a P fertilizer. The present invention focuses on this additional destabilizing effect of the additional P-containing fertilizer.

For example, it has been observed that if urea granules, which have been treated with a formulation comprising the urease inhibitors N-n-butylthiophosphoric acid triamide (NBPT) and N-n-propylthiophosphoric acid triamide (NPPT), are mixed with granules comprising triple super phosphate (TSP) a decomposition of 50 to 90 wt.-% of the urease inhibitors is observed after only one day depending on the amount of TSP in the mixture, while no decomposition is observed after one day in the absence of TSP granules.

It was therefore an object of the present invention to provide a stabilizing agent, which is suitable for preventing decomposition of (thio)phosphoric acid triamide urease inhibitors, if the urease inhibitors are not only applied together with urea-containing fertilizers, but also with with an additional P-containing fertilizer which is preferably a NPK fertilizer, a NP fertilizer, a PK fertilizer, or a P fertilizer. In this connection, it was another object to improve the storage life of compositions comprising the (thio)phosphoric acid triamide a fertilizer mixture comprising a urea-containing fertilizer and with an additional P-containing fertilizer which is preferably a NPK fertilizer, a NP fertilizer, a PK fertilizer, or a P fertilizer.

In particular, it was an object of the present invention to prevent decomposition of a (thio)phosphoric acid triamide, which is caused by the additional P-containing fertilizer which is preferably a NPK fertilizer, a NP fertilizer, a PK fertilizer, or a P fertilizer, but not by the urea-containing fertilizer. In this regard, it was desired to reduce the decomposition caused by the additional P-containing fertilizer as such that less than 10 wt.-% based on the total amount of the (thio)phosphoric acid triamide decompose due to the influence of the additional P-containing fertilizer within 15 days at a temperature of 20° C. to 25° C.

In connection with the above objects, it was further desired to provide a stabilizing agent, which is toxicologically unobjectionable, which does not adversely affect the urease inhibiting effect and/or the activity of the (thio)phosphoric acid, which can be easily and safely packaged, transported and shipped, even in large quantities, and which can be easily and safely handled and applied for soil treatment, even in large quantities.

In view of the above objects, the present invention relates to the use of a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

in a composition A comprising
(i) a (thio)phosphoric acid triamide (2) according to general formula (I)

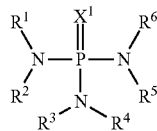

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
and
(ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer;
to prevent decomposition of the (thio)phosphoric acid triamide (2).

Furthermore, the present invention relates to a method for preventing decomposition of a (thio)phosphoric acid triamide (2) according to general formula (I)

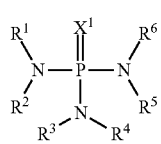

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_2$O-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
in a composition A comprising
(i) the (thio)phosphoric acid triamide (2);
and
(ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer;
by adding a cation source (1) comprising a cation $C^{m+}$ to the composition A, wherein
$C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl.

It has surprisingly been found by the inventors of the present invention that decomposition of a (thio)phosphoric acid triamide (2) as defined above in a composition A comprising the (thio)phosphoric acid triamide (2) and a fertilizer mixture (3) as defined above can be prevented by using or adding a cation source (1) comprising a cation $C^{m+}$ as defined above.

In particular, it has been found that, while the P-containing fertilizer (3b) typically causes a decomposition of the (thio)phosphoric acid triamide (2) of at least 10 wt.-% based on the total amount of the (thio)phosphoric acid triamide within 15 days at a temperature of from 20° C. to 25° C., if no cation source (1) is present, the situation is completely different if a cation source (1) is present. In particular, it has been found that the decomposition, which is caused by the P-containing fertilizer (3b), can be reduced as such that less than 10 wt.-% based on the total amount of the (thio)phosphoric acid triamide (2) decompose due to the influence of the P-containing fertilizer (3b) within 15 days at a temperature of 20° C. to 25° C., if a cation source (1) is present. Preferably, the decomposition, which is caused by the P-containing fertilizer (3b), can be reduced as such that less than 10 wt.-% based on the total amount of the (thio)phosphoric acid triamide (2) decompose due to the influence of the P-containing fertilizer (3b) within 1 month at a temperature of 20° C. to 25° C., if a cation source (1) is present.

The above described improved storage stability of compositions comprising a (thio)phosphoric acid triamide (2) and a fertilizer mixture (3) as defined above is highly advantageous from the commercial perspective, as the (thio)phosphoric acid triamide (2) may be applied to the fertilizer mixture (3) at an early stage, and the resulting composition can be stored until the time of its spreading to the soil. Accordingly, it is not required to store the (thio)phosphoric acid triamide (2) and a fertilizer mixture (3) separately and to apply the (thio)phosphoric acid triamide (2) to the fertilizer mixture (3) only shortly before the application to the soil, which would complicate the handling for the user. Furthermore, the application rates of the compositions comprising the (thio)phosphoric acid triamide (2) and the fertilizer mixture (3) can be reduced, as the stability of the (thio)phosphoric acid triamide (2) is improved during storage, so that more (thio)phosphoric acid triamide (2) is available at the time of applying the composition to the soil resulting in a long urease inhibition.

The present invention further relates to a mixture M comprising (i) a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl and (ii) a (thio)phosphoric acid triamide (2) according to general formula (I)

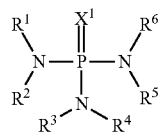

(I)

wherein $X^1$ is O or S;

$R^1$ is $C_1$-$C_{20}$-alkyl, $C_3$-$C_2$O-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_2$O-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl.

The mixture M according to the invention may advantageously be used for treating a fertilizer mixture (3). By providing the (thio)phosphoric acid triamide (2) in combination with the cation source (1), the (thio)phosphoric acid triamide (2) is directly provided in combination with a stabilizing agent, so that when being combined with the fertilizer mixture (3), the cation source (1) will exhibit its advantageous effect on the stability of the (thio)phosphoric acid triamide (2) as described in detail above.

Furthermore, the present invention relates to a granule G comprising a urea-containing fertilizer (3a) and/or a P-containing fertilizer (3b) which is preferably a NPK fertilizer, a NP fertilizer, a PK fertilizer, or a P fertilizer, wherein the granule is coated with a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl.

The granule G according to the invention is advantageous because the fertilizer (3a) and/or (3b) can be provided in combination with the stabilizing agent, i.e. the cation source (1), so that, when the (thio)phosphoric acid triamide (2) is added as urease inhibitor, the cation source (1) will exhibit its advantageous effect on the stability of the (thio)phosphoric acid triamide (2) as described in detail above.

Moreover, the present invention relates to a composition B comprising (i) a (thio)phosphoric acid triamide (2) according to general formula (I)

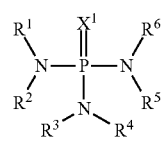

(I)

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl;

(ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer; and (iii) a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

wherein the composition B is obtainable by a process comprising the steps of (a1) treating granules comprising the urea-containing fertilizer (3a) and the (thio)phosphoric acid triamide (2) with the cation source (1);

(b1) blending the treated granules of step (a1) with granules comprising the P-containing fertilizer (3b);

or by a process comprising the steps of (a2) treating granules comprising the P-containing fertilizer (3b) with the cation source (1);

(b2) blending the treated granules of step (a2) with granules comprising the urea-containing fertilizer (3a) and the (thio)phosphoric acid triamide (2);

or by a process comprising the steps of (a3) blending granules comprising the urea-containing fertilizer (3a) and the (thio)phosphoric acid triamide (2) with granules comprising the P-containing fertilizer (3b); and (b3) treating the blend of step (a3) with the cation source (1);

or by a process comprising the steps of (a4) treating granules comprising the fertilizer mixture (3) with the (thio)phosphoric acid triamide (2); and (b4) treating the treated granules of step (a4) with the cation source (1);

or by a process comprising the steps of (a5) treating granules comprising the fertilizer mixture (3) with the cation source (1); and (b5) treating the treated granules of step (a5) with the (thio)phosphoric acid triamide (2); or by a process comprising the steps of (a6) providing granules comprising the fertilizer mixture (3); and (b6) treating the granules of step (a6) with a—solid or liquid—mixture comprising the (thio)phosphoric acid triamide (2) and the cation source (3);

or by a process comprising the steps of (a7) providing granules comprising the fertilizer mixture (3) and the cation source (1); and (b7) treating the granules of step (a7) with the (thio) phosphoric acid triamide (2).

The above defined composition B comprises the (thio) phosphoric acid triamide (2), the fertilizer mixture (3), and the cation source (1) as stabilizing agent. Accordingly, the composition B exhibits the advantageous properties in terms of the stability as outlined in detail above.

Furthermore, the composition B is specified in terms of processes for combining the different components of the composition B. The processes result in advantageous structural features of the composition B, which may enhance the stabilizing effect of the cation source (1).

The present invention is described in detail hereinafter. The following definitions and preferred embodiments apply to the use (and the composition A defined in this connection), the method (and the composition A defined in this connection), the mixture M, the granule G, and the composition B as defined herein. It is to be understood that the preferred embodiments are preferred on their own as well as in combination.

As used in this specification and in the appended claims, the singular forms of "a" and "an" also include the respective plurals unless the context clearly dictates otherwise.

The term "fertilizer mixture (3)" also refers to granules, capsules, compartments or other units in which both the urea-containing fertilizer (3a) and the P-containing fertilizer (3b) are contained in one granule, capsule, compartment or unit.

The term "at least one" as used herein means one or more, preferably one or two, and thus typically refers to individual compounds or mixtures/combinations.

The abbreviation wt.-% or wt.-% stands for "percent by weight".

The term "cation source" as used herein preferably refers to a compound or composition, which comprises a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl.

In one embodiment, the cation source (1) is a salt or an ion exchange material.

In one preferred embodiment, the cation source (1) is a salt, for example a salt of the formula $(C^{m+})_n(A^{n-})_m$, wherein $C^{m+}$ represents a cation as defined above with m being 1, 2, or 3, and $A^{n-}$ represents an anion with n being 1, 2, or 3.

Regarding the selection of a suitable salt, the cation of the salt is essential. Preferred cations $C^{m+}$ include $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, or $Ba^{2+}$. In a preferred embodiment, the cation source (1) is therefore a salt, which comprises a cation $C^{m+}$ include $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, or $Ba^{2+}$. A particularly preferred cation $C^{m+}$ is $Mg^{2+}$ or $Ca^{2+}$. In a more preferred embodiment, the cation source is therefore a salt, which further comprises a cation $C^{m+}$, wherein $C^{m+}$ is $Mg^{2+}$ or $Ca^{2+}$. In one particularly preferred embodiment $C^{m+}$ is $Ca^{2+}$. In another particularly preferred embodiment, $C^{m+}$ is $Mg^{2+}$.

Suitable anions $A^{n-}$ include $F^-$, $Cl^-$, $Br^-$, $I^-$, $SO_4^{2-}$, $NO_3^-$, or $CH_3CO_2^-$. In a preferred embodiment, the cation source is therefore a salt, which further comprises an anion $A^{n-}$, wherein $A^{n-}$ is $F^-$, $Cl^-$, $Br^-$, $I^-$, $SO_4^{2-}$, $NO_3^-$, or $CH_3CO_2^-$. In a more preferred embodiment, the cation source (1) is a salt, which comprises an anion $A^{n-}$, wherein $A^{n-}$ is $Cl^-$ or $SO_4^{2-}$. In one particularly preferred embodiment $A^{n-}$ is $Cl^-$. In another particularly preferred embodiment, $A^{n-}$ is $SO_4^{2-}$.

Preferred salts include $Al_2(SO_4)_3$, $Fe(SO_4)$, $Fe_2(SO_4)_3$, $ZnSO_4$, $CuSO_4$, $CaSO_4$, $AlCl_3$, $FeCl_2$, $FeCl_3$, $ZnCl_2$, $CuCl_2$, $Mg(NO_3)_2$, $Ca(NO_3)_2$, $CaCl_2$, and $MgSO_4$. More preferably, the salt is $CaCl_2$ or $MgSO_4$. In a preferred embodiment, the cation source (1) is a therefore a salt, which is selected from the group consisting of $Al_2(SO_4)_3$, $Fe(SO_4)$, $Fe_2(SO_4)_3$, $ZnSO_4$, $CuSO_4$, $CaSO_4$, $AlCl_3$, $FeCl_2$, $FeCl_3$, $ZnCl_2$, $CuCl_2$, $Mg(NO_3)_2$, $Ca(NO_3)_2$, $CaCl_2$, and $MgSO_4$, and is preferably $CaCl_2$ or $MgSO_4$. In one particularly preferred embodiment, the salt is $CaCl_2$. In another particularly preferred embodiment, the salt is $MgSO_4$.

It is to be understood that the salts may be provided in anhydrous form or in the form of hydrates.

Hydrates are salts containing water molecules combined in a definite ratio as an integral part of the crystal that are either bound to a metal center or that have crystallized with the metal complex. Such hydrates are also said to contain water of crystallization or water of hydration. The notation "salt x·nH$_2$O", where n is the number of water molecules per formula unit of the salt, is commonly used to show that a salt is hydrated. The "n" is usually a low integer in the range of from 1 to 12, and is for example 1, 2, 3, 4, 5, 6, 7, 8, 9, 10, 11, or 12, and it is possible that fraction numbers occur. For example, in a monohydrate n is one, and in a hexahydrate n is 6, and in a heptahydrate n is 7. In case the cation source (1) or the salt is $MgSO_4$, anhydrous magnesium sulfate, magnesium sulfate monohydrate, magnesium sulfate heptahydrate, or a mixture thereof can be preferably used, wherein the magnesium sulfate monohydrate is most preferred.

It is to be understood that the salts as used herein may also be double salts, i.e. salts comprising two or more cations and/or two or more anions. They can be obtained by combination of two different salts, which are crystallized in the same regular ionic lattice. Examples of double salts include alums (with the general formula $C_aC_b[SO_4]_2 \times 12H_2O$), wherein $C_a$ and $C_b$ represent different cations of which $C_a$ is $C_a^+$ and $C_b$ is $C_b^+$, or Tutton's salts (with the general formula $[C_d]_2C_d[SO_4]_2 \times 6H_2O$), wherein $C_c$ and $C_d$ represent different cations of which $C_c$ is $C_c^+$ and $C_d$ is $C_d^{2+}$. Further examples of double salts include ammonium iron(II) sulfate $((NH_4)_2Fe(SO_4)_2 \times 6H_2O)$ and bromlite $(BaCa(CO_3)_2)$.

In one embodiment, the cation source (1) is a salt, which has a solubility of at least 33 g/L in water at a temperature of from 15° C. to 25° C. Preferably the solubility is at least 100 g/L in water at a temperature of from 15° C. to 25° C. It is to be understood that the solubility is measured in deionized or distilled water. A certain solubility of the salt is advantageous in view of the fact that the salt can easily dissolve, and the cations thus be released from the crystal lattice.

In another preferred embodiment, the cation source (1) is an ion exchange material.

Suitable ion exchange materials include zeolites and ion exchange resins.

Zeolites are aluminosilicates, which have a porous structure that can accommodate a wide variety of cations, such as $Ca^{2+}$, $Mg^{2+}$ and others. These positive ions are rather loosely held and can readily be exchanged for others in a contact solution. Some of the more common mineral zeolites are analcime, chabazite, clinoptilolite, heulandite, natrolite, phillipsite, and stilbite. An example mineral formula is: $Na_2Al_2Si_3O_{10} \times 2H_2O$, the formula for natrolite. As cations, such as $Ca^{2+}$ or $Mg^{2+}$ can be released from zeolites, zeolites exhibit a stabilizing effect in the context of the present invention.

In a preferred embodiment of the invention the cation source (1) is therefore zeolite, which comprises a cation $C^{m+}$, wherein $C^{m+}$ is $Ca^{2+}$ or $Mg^{2+}$.

Ion exchange resins comprise an insoluble matrix (or support structure) normally in the form of small (0.3-1 mm diameter) beads, fabricated from an organic polymer substrate. The beads are typically porous, providing a high surface area. The pore size is typically below 5 nm, preferably below 4 nm. The trapping of ions occurs with the accompanying releasing of other ions.

For example, anion exchange resins may be used, which are capable of adsorbing anions such as $PO_4^{3-}$, $NO_3^-$, or $SO_4^{2-}$, in particular $PO_4^{3-}$. The skeleton of such anion exchange resins may be formed by copolymerization of styrene and divinylbenzene (DVB). The DVB links the linear styrene chains together and yields an insoluble three-dimensional polymer. The DVB may for example be used in an amount of from 1 to 10 wt.-% based on the total weight of the polymer. The functional group of the resins is cationic and preferably comprises a quaternary ammonium group. As used herein, an anion exchange resin is therefore to be understood as falling within the term "cation source (1) comprising a cation $C^{m+}$", wherein $C^{m+}$ is a quaternary ammonium group comprising at least three groups selected from $C_1$-$C_2$-alkyl and $C_1$-$C_2$-hydroxyalkyl. Preferably, the groups on the nitrogen atom of the ammonium group are methyl groups and/or ethanol groups. Particularly preferred are trimethylammonium groups as functional groups.

In a preferred embodiment, the cation source (1) is therefore an anion exchange resin, which comprises a cation $C^{m+}$, wherein $C^{m+}$ is a quaternary ammonium group comprising at least three groups selected from $C_1$-$C_2$-alkyl and $C_1$-$C_2$-hydroxyalkyl, and is preferably a quaternary ammonium group comprising three methyl groups or two methyl groups and one hydroxyethyl group.

The cationic groups of the anion exchange resins can exhibit a stabilizing effect in the context of the present invention.

The ion exchange resin may alternatively be a cation exchange resin. Accordingly, the ion exchange resin may comprise and release cations, such as $Ca^{2+}$, $Mg^{2+}$ and others. The skeleton of the resin is also typically based on styrene and DVB as outlined in the context of anion exchange resin. The functional group of the cation exchange resins is typically anionic and preferably comprises a sulfonic acid group or a carboxylic acid group. As cations, such as $Ca^{2+}$ or $Mg^{2+}$ can be released from cation exchange resins, such resins can exhibit a stabilizing effect in the context of the present invention.

In a preferred embodiment of the invention, the cation source (1) is therefore a cation exchange resin, which comprises a cation $C^{m+}$, wherein $C^{m+}$ is $Ca^{2+}$ or $Mg^{2+}$.

As used herein, the term "(thio)phosphoric acid triamide" in each case covers thiophosphoric acid triamides and phosphoric acid triamides. Thus, the prefix "(thio)" as used herein in each case indicates that a group P=S or a group P=O is covered. However, if the prefix "thio" is used without brackets, this indicates that a group P=S is present.

It is noted that the terms "(thio)phosphoric acid triamide" and "(thio)phosphoric triamide" may interchangeably be used.

As used herein, "(thio)phosphoric acid triamides" may be represented by the following general formula (I)

wherein
$X^1$ is O or S; $R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl.

The organic moieties mentioned in the above definitions of the variables are collective terms for individual listings of the individual group members. The prefix $C_n$-$C_m$ indicates in each case the possible number of carbon atoms in the group.

The term "alkyl" as used herein denotes in each case a straight-chain or branched alkyl group having usually from 1 to 20 carbon atoms, preferably from 1 to 10 carbon atoms, frequently from 1 to 6 carbon atoms, more preferably 1 to 4 carbon atoms, e.g. 3 or 4 carbon atoms. Examples of alkyl groups are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-di methyl propyl, 1-ethylpropyl, n-hexyl, 1,1-dimethylpropyl, 1,2-dimethylpropyl, 1-methylpentyl, 2-methylpentyl, 3-methyl pentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Preferred alkyl groups are methyl, ethyl, n-propyl, isopropyl, n-butyl, isobutyl, sec-butyl, tert-butyl, n-pentyl, isopentyl, neopentyl, tert-pentyl, hexyl, 2-methylpentyl, n-heptyl, n-octyl, 2-ethylhexyl, isooctyl, nonyl, isononyl, decyl, and isodecyl.

The term "cycloalkyl" as used herein denotes in each case a monocyclic cycloaliphatic radical having usually from 3 to 20 carbon atoms, preferably from 3 to 10 carbon atoms, more preferably from 3 to 6 carbon atoms, such as cyclopropyl, cyclobutyl, cyclopentyl, cyclohexyl, cycloheptyl, cyclooctyl, cyclononyl and cyclodecyl or cyclopropyl, cyclobutyl, cyclopentyl and cyclohexyl.

The term "aryl" includes mono-, bi- or tricyclic aromatic radicals having usually from 6 to 14, preferably 6, 10, or 14 carbon atoms. Exemplary aryl groups include phenyl, naphthyl and anthracenyl. Phenyl is preferred as aryl group.

The term "arylalkyl" refers to aryl as defined above, which is bonded via a $C_1$-$C_4$-alkyl group, in particular a methyl group (=arylmethyl), to the remainder of the molecule, examples including benzyl, 1-phenylethyl, 2-phenylethyl, etc.

The term "heterocycle" or "heterocyclyl" includes 5- or 6-membered monocyclic heterocyclic non-aromatic radicals. The heterocyclic non-aromatic radicals usually comprise 1 or 2 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-dioxothiopyranyl, dihydrothiopyranyl, S-oxodihydrothiopyranyl, S-dioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Preferred examples of heterocyclic radicals are piperazinyl, morpholinyl, pyrrolyl, pyrazolyl, triazolyl, oxazolyl, thiazolyl, and imidazolyl groups.

The term "(di)alkylaminocarbonyl" refers to a (di)alkylamino group, i.e. an amino group comprising 1 or 2 alkyl substituents, which is bonded to the remainder of the molecule via the carbon atom of a carbonyl group (C=O).

It is to be understood that, preferably, also stereoisomers, tautomers, N-oxides, and salts of the (thio)phosphoric acid triamides are covered by the term "(thio)phosphoric acid triamide". Stereoisomers are present, if the compounds contain one or more centers of chirality. In this case, the compounds will be present in the form of different enantiomers or diastereomers, if more than one center of chirality is present. The term "(thio)phosphoric acid triamide" preferably covers every possible stereoisomer, i.e. single enantiomers or diastereomers, as well as mixtures thereof. Tautomers include, e.g., keto-enol tautomers. N-oxides may be formed under oxidative conditions, if tertiary amino groups are present. Salts may be formed, e.g., with the basic amino groups of the (thio)phosphoric acid triamides. Anions, which stem from an acid, with which the (thio)phosphoric acid amide may have been reacted, are e.g. chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate.

In a preferred embodiment, the (thio)phosphoric acid triamide (2) may be represented by the following general formula (I)

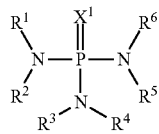

(I)

wherein
$X^1$ is O or S;
$R^1$ is $C_1$-$C_5$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H.

Preferably, the (thio)phosphoric acid triamide (2) may be represented by the above formula (I), wherein
$X^1$ is S;
$R^1$ is $C_1$-$C_5$-alkyl, $C_5$-$C_6$-cycloalkyl, phenyl, or benzyl;
$R^2$ is H or $C_1$-$C_4$-alkyl; and
$R^3$, $R^4$, $R^5$, and $R^6$ are each H;
and wherein even more preferably
$X^1$ is S;
$R^1$ is $C_1$-$C_5$-alkyl;
$R^2$ is H or $C_1$-$C_4$-alkyl; and
$R^3$, $R^4$, $R^5$, and $R^6$ are each H.

It is to be understood that the term "(thio)phosphoric acid triamide (2)" may also cover combinations of (thio)phosphoric acid triamides (2) according to formula (I) as defined above.

In one embodiment of the invention, the (thio)phosphoric acid triamide (2) is selected from the group consisting of N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide, and combinations thereof.

In one embodiment of the invention, the (thio)phosphoric acid triamide (2) is N-n-butylthiophosphoric acid triamide (NBPT), N-n-propylthiophosphoric acid triamide (NPPT), or a combination thereof.

In one preferred embodiment of the invention, the (thio)phosphoric acid triamide (2) is N-n-propylthiophosphoric acid triamide (NPPT) having the following chemical formula:

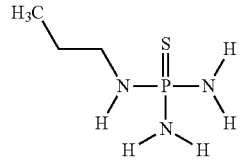

In another preferred embodiment of the invention, the (thio)phosphoric acid triamide (2) is N-n-butylthiophosphoric acid triamide (NBPT) having the following chemical formula:

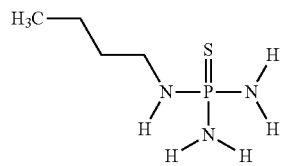

In yet another preferred embodiment of the invention, the (thio)phosphoric acid triamide (2) is a combination of N-n-butylthiophosphoric acid triamide (NBPT) and N-n-propylthiophosphoric acid triamide (NPPT). It is particularly preferred that the (thio)phosphoric acid triamide (2) is a combination of NBPT and NPPT, which comprises NBPT in amounts of from 40 to 95 wt.-%, more preferably from 60 to 85 wt.-%, particularly preferably from 72 to 80 wt.-%, in each case based on the total weight of the combination.

The fertilizer mixture (3) as defined herein comprises a urea-containing fertilizer (3a) and an additional P-containing fertilizer (3b) which is preferably a NPK fertilizer, a NP fertilizer, a PK fertilizer, or a P fertilizer.

As used herein, the term "fertilizer" covers any chemical compound that improves the levels of available plant nutrients and/or the chemical and physical properties of soil, thereby directly or indirectly promoting plant growth, yield, and quality. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, and limestone.

As used herein, a "urea-containing fertilizer (3a)" is defined as a fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, and ureaglyoxal condensates.

In a preferred embodiment of the invention, the urea-containing fertilizer (3a) is urea.

In customary commercial fertilizer quality, the urea has a purity of at least 90%, and may for example be in crystalline, granulated, compacted, prilled or ground form.

As used herein, the "P-containing fertilizer (3b)" is any fertilizer providing any form of the chemical element phosphorus (P) or containing any chemical compounds incorporating the chemical element phosphorus (P), including but not limited to phosphate-containing fertilizers or fertilizers containing $P_2O_5$. Preferably, the P-containing fertilizer is selected from the group consisting of a NPK fertilizer, a NP fertilizer, a PK fertilizer, or a P fertilizer. Most preferably, the P-containing fertilizer is a NPK fertilizer. Of course, also combinations of these fertilizers may be used as additional P-containing fertilizer (3b).

P fertilizers, K fertilizers, and N fertilizers are straight fertilizers, i.e. fertilizers that contain only one of the nutritive elements P, K, and N. It is to be understood, however, that these fertilizers may additionally comprise at least one additional nutritive element selected from C, H, O, S, Ca, Mg, Fe, Mn, Cu, Zn, Mo, and B.

Preferred P fertilizers include basic slag (Thomas phosphate), superphosphate, triple superphosphate, partly digested phosphate rock, soft phosphate rock, dicalcium phosphate, thermal (fused) phosphate, aluminum phosphate, and combinations thereof.

NPK fertilizers, NP fertilizers, and PK fertilizers are multinutrient fertilizers, i.e. fertilizers that comprise combinations of the nutritive elements P, K, and N as indicated by the terms "NPK", "NP", and "PK". It is to be understood, however, that these fertilizers may additionally comprise at least one additional nutritive element selected from C, H, O, S, Ca, Mg, Fe, Mn, Cu, Zn, Mo, and B.

The NPK fertilizers, NP fertilizers, and PK fertilizers may be provided as complex fertilizers or bulk-blend or blended fertilizers. The term complex fertilizer refers to a compound fertilizer formed by mixing ingredients that react chemically. In bulk-blend or blended fertilizers, two or more granular fertilizers of similar size are mixed to form a compound fertilizer.

According to the EEC Guidelines, NPK fertilizers must contain at least 3 wt.-% N plus 5 wt.-% $P_2O_5$ plus 5 wt.-% $K_2O$ and at least 20 wt.-% total nutrients, based on the total weight of the NPK fertilizer. The most commonly used grades (N—$P_2O_5$—$K_2O$, each in wt %) are nutrient ratio 1:1:1:
15-15-15, 16-16-16, 17-17-17
nutrient ratios 1:2:3 and 1:1.5:2:
5-10-15, 6-12-18, 10-15-20
nutrient ratio 1:1:1.5-1.7:
13-13-21, 14-14-20, 12-12-17
nutrient ratios 3:1:1 and 2:1:1:
24-8-8, 20-10-10
low-phosphate grades:
15-5-20, 15-9-15

The minimum analysis for NP fertilizers under the EEC Guidelines is 3 wt.-% N and 5 wt.-% $P_2O_5$ and at least 18 wt.-% total nutrients, based on the total weight of the NP fertilizer. Common grades are 20-20, 22-22, 26-14, 11-52, 16-48, and 18-46. These products are appropriate for potassium-rich soils or where potash is supplied as a separate fertilizer.

In the group of PK fertilizers, all combinations of the straight P and K fertilizers listed above are possible. In general, the materials are first milled and then mixed and granulated, so that a fairly homogeneous mixture is obtained. Some products are also made by bulk blending. The EEC Guidelines set forth a minimum analysis of 5 wt.-% $P_2O_5$, 5 wt.-% $K_2O$, and at least 18 wt.-% nutrients, based on the total weight of the PK fertilizer.

It has been found that in particular phosphate-containing fertilizers can cause stability problems of (thio)phosphoric acid triamides (2).

In one embodiment of the invention, the additional P-containing fertilizer (3b) is therefore a phosphate-containing fertilizer, i.e. a fertilizer selected from the group consisting of a NPK fertilizer, a NP fertilizer, a PK fertilizer, and a P fertilizer as defined above.

In one embodiment of the invention, the additional P-containing fertilizer (3b) causes a decomposition of the (thio)phosphoric acid triamide (2) of at least 10 wt.-% based on the total amount of the (thio)phosphoric acid triamide within 15 days at a temperature of from 20° C. to 25° C., if no cation source (1) according to the invention is present.

In a preferred embodiment, the P-containing fertilizer (3b) is selected from the group consisting of monoammonium phosphate (MAP), diammonium phosphate (DAP), calcium phosphate, super phosphate, double super phosphate, triple super phosphate (TSP), phosphate rock, ammonium polyphosphate (APP), and combinations thereof.

In one particularly preferred embodiment, the P-containing fertilizer (3b) is monoammonium phosphate (MAP).

In one particularly preferred embodiment, the P-containing fertilizer (3b) is diammonium phosphate (DAP).

In one particularly preferred embodiment, the P-containing fertilizer (3b) is calcium phosphate.

In one particularly preferred embodiment, the P-containing fertilizer (3b) is super phosphate.

In one particularly preferred embodiment, the P-containing fertilizer (3b) is double super phosphate.

In one particularly preferred embodiment, the P-containing fertilizer (3b) is triple super phosphate (TSP).

In one particularly preferred embodiment, the P-containing fertilizer (3b) is phosphate rock.

In one particularly preferred embodiment, the P-containing fertilizer (3b) is ammonium polyphosphate (APP).

As already indicated above, the cation source (1) as defined herein is used in a composition A comprising a (thio)phosphoric acid triamide (2) and a fertilizer mixture (3) comprising a urea-containing fertilizer (3a) and an additional P-containing fertilizer (3b) to prevent decomposition of the (thio)phosphoric acid triamide (2). Furthermore, the present invention relates to a method for preventing decomposition of a (thio)phosphoric acid triamide (2) in a compositions A comprising the (thio)phosphoric acid triamide (2) and a fertilizer mixture (3) comprising a urea-containing fertilizer (3a) and an additional P-containing fertilizer (3b). The fertilizers (3a) and (3b) as well as the cation source (1) have been described in detail above. Furthermore, the (thio)phosphoric acid triamide (2) has been described in detail above.

As used herein, the term "to prevent decomposition of the (thio)phosphoric acid triamide (2)" is to be understood as follows.

The additional P-containing fertilizer (3b) according to the invention typically causes a decomposition of the (thio)phosphoric acid triamide (2) of at least 1 wt.-% based on the total amount of the (thio)phosphoric acid triamide within 15 days at a temperature of from 20° C. to 25° C., if no cation source (1) according to the invention is present.

In the focus of the invention is an additional P-containing fertilizer (3b), which causes a decomposition of the (thio)phosphoric acid triamide (2) of at least 5 wt.-% based on the total amount of the (thio)phosphoric acid triamide within 15 days at a temperature of from 20° C. to 25° C., if no cation source (1) according to the invention is present.

Even more in the focus of the invention is an additional P-containing fertilizer (3b), which causes a decomposition of the (thio)phosphoric acid triamide (2) of at least 10 wt.-% based on the total amount of the (thio)phosphoric acid triamide within 15 days at a temperature of from 20° C. to 25° C., if no cation source (1) according to the invention is present.

The cation source (1) prevents this decomposition due to the stabilizing effect exhibited by the cations $C^{m+}$.

It is to be understood that a decomposition of the (thio)phosphoric acid (2) may additionally be caused by the fertilizer (3a). However, as used in the context of the present invention, the term "to prevent decomposition of the (thio)phosphoric acid triamide (2)" preferably refers to the decomposition, which is caused by the P-containing fertilizer (3b), but not by the fertilizer (3a). Thus, the present invention focuses on the decomposition problems caused by the P-containing fertilizer (3b) only, and in this context the cation source (1) as defined herein may be beneficially used.

In one embodiment, the cation source (1) as defined herein reduces the decomposition, which is caused by the P-containing fertilizer (3b), as such that less than 50 wt.-% based on the total amount of the (thio)phosphoric acid triamide (2) decompose due to the influence of the P-containing fertilizer (3b) within 15 days at a temperature of 20° C. to 25° C. Preferably, the cation source (1) as defined herein reduces the decomposition, which is caused by the P-containing fertilizer (3b), as such that less than 50 wt.-% based on the total amount of the (thio)phosphoric acid triamide (2) decompose due to the influence of the P-containing fertilizer (3b) within 1 month at a temperature of 20° C. to 25° C. More preferably, the cation source (1) as defined herein reduces the decomposition, which is caused by the P-containing fertilizer (3b), as such that less than 50 wt.-% based on the total amount of the (thio)phosphoric acid triamide (2) decompose due to the influence of the P-containing fertilizer (3b) within 2 months at a temperature of 20° C. to 25° C.

In another embodiment, the cation source (1) as defined herein reduces the decomposition, which is caused by the P-containing fertilizer (3b), as such that less than 20 wt.-% based on the total amount of the (thio)phosphoric acid triamide (2) decompose due to the influence of the P-containing fertilizer (3b) within 15 days at a temperature of 20° C. to 25° C. Preferably, the cation source (1) as defined herein reduces the decomposition, which is caused by the P-containing fertilizer (3b), as such that less than 20 wt.-% based on the total amount of the (thio)phosphoric acid triamide (2) decompose due to the influence of the P-containing fertilizer (3b) within 1 month at a temperature of 20° C. to 25° C. More preferably, the cation source (1) as defined herein reduces the decomposition, which is caused by the P-containing fertilizer (3b), as such that less than 20 wt.-% based on the total amount of the (thio)phosphoric acid triamide (2) decompose due to the influence of the P-containing fertilizer (3b) within 2 months at a temperature of 20° C. to 25° C.

In another embodiment, the cation source (1) as defined herein reduces the decomposition, which is caused by the P-containing fertilizer (3b), as such that less than 10 wt.-% based on the total amount of the (thio)phosphoric acid triamide (2) decompose due to the influence of the P-containing fertilizer (3b) within 15 days at a temperature of 20° C. to 25° C. Preferably, the cation source (1) as defined herein reduces the decomposition, which is caused by the P-containing fertilizer (3b), as such that less than 10 wt.-% based on the total amount of the (thio)phosphoric acid triamide (2) decompose due to the influence of the P-containing fertilizer (3b) within 1 month at a temperature of 20° C. to 25° C. More preferably, the cation source (1) as defined herein reduces the decomposition, which is caused by the P-containing fertilizer (3b), as such that less than 10 wt.-% based on the total amount of the (thio)phosphoric acid triamide (2) decompose due to the influence of the P-containing fertilizer (3b) within 2 months at a temperature of 20° C. to 25° C.

The amount of the (thio)phosphoric acid triamide in a sample after a certain time period may be detected e.g. by HPLC using method DIN EN 16651. In order to exclude a destabilizing effect caused by the urea-containing fertilizer (3a), the (thio)phosphoric acid triamide (2) may be provided in combination with a stabilizing agent, which prevents decomposition caused by the fertilizer (3a). By comparing the decomposition of the (thio)phosphoric acid triamide (2) in the presence of the fertilizer (3a) only, with the decomposition of the (thio)phosphoric acid triamide (2) in the presence of the fertilizer mixture (3) comprising the fertilizer (3a) and the P-containing fertilizer (3b), the decomposition caused by the P-containing fertilizer (3b) can be determined. By comparing this result with the result in the case that a cation source (1) is present, the extent to which the cation source (1) prevents decomposition caused by the P-containing fertilizer (3b) can be determined.

Alternatively, the amount of the (thio)phosphoric acid triamide (2) in a sample after a certain time period may be determined indirectly by determining the urease inhibiting efficacy that is observable. The urease-inhibiting efficacy may be determined by the Dräger test as outlined in the Examples. The Dräger test is based on the determination of the concentration of ammonia gas that is set free from a soil sample being treated with a urea-containing fertilizer once a day. In general, a certain amount of ammonia is typically produced within a certain time period in a soil sample being treated with a urea-containing fertilizer due to the degradation of the urea-containing fertilizer caused by the urease, which is present in the soil. If the urea-containing fertilizer is provided in combination with a urease inhibitor such as a (thio)phosphoric acid triamide (2), the degradation of the urea-containing fertilizer is slowed down, so that a lower amount of ammonia will be produced in the same time period. On the other hand, if the (thio)phosphoric acid triamide (2) has decomposed to a certain extent, e.g. upon storage, the production of ammonia will be reduced only to a lower extent. The ammonia concentration measured after a certain time period may thus be correlated with the amount of the (thio)phosphoric acid triamide (2) in a sample. In order to exclude a destabilizing effect caused by the urea-containing fertilizer (3a), the (thio)phosphoric acid triamide (2) may be provided in combination with a stabilizing agent, which prevents decomposition caused by the fertilizer (3a). By comparing the decomposition of the (thio)phosphoric acid triamide (2) in the presence of the fertilizer (3a) only, with the decomposition of the (thio)phosphoric acid triamide (2) in the presence of the fertilizer mixture (3) comprising the fertilizer (3a) and the P-containing fertilizer (3b), the decomposition caused by the P-containing fertilizer (3b) can be determined. By comparing this result with the result in the case that a cation source (1) is present, the extent to which the cation source (1) prevents decomposition caused by the P-containing fertilizer (3b) can be determined.

In one embodiment, the cation source (1) as defined herein reduces the decomposition of the (thio)phosphoric acid triamide, which is caused by the P-containing fertilizer (3b), as such that after a storage time of up to 15 days at a temperature of 20° C. to 25° C.,
    the (thio)phosphoric acid triamide (2) being provided in a composition comprising the fertilizer mixture (3) comprising the fertilizer (3a) and the P-containing fertilizer (3b) and the cation source (1) exhibits at least 50% of the urease inhibiting efficacy of
    a (thio)phosphoric acid triamide (2) being provided in a composition comprising the fertilizer (3a), but no P-containing fertilizer (3b), and no cation source (1),
    wherein at least 50% of the urease inhibiting efficacy means that the time until a threshold value of ammonia is reached is reduced by at most 50%.

As outlined above, the ammonia is produced in a soil sample being treated with the above mentioned compositions and can be measured according to the Dräger test.

Depending on the soil sample, typical threshold values include 600 ppm, 500 ppm, 400 ppm or 300 ppm. These threshold values may be reached for example after a time of 5, 6, 7, 8, 9, 10, 11, 12, 13, 14 or 15 days, if the (thio)phosphoric acid triamide (2) is provided in a composition comprising the fertilizer (3a), but no P-containing fertilizer (3b), and no cation source (1).

For example, in the case that a threshold value of 600 ppm is reached after 10 days, if the (thio)phosphoric acid triamide (2) is provided in a composition comprising the fertilizer (3a), but no P-containing fertilizer (3b), and no cation source (1), the above embodiment is to be understood as such that the threshold value of 600 ppm is reached at the earliest after 5 days, if the (thio)phosphoric acid triamide (2) is provided in a composition comprising the fertilizer mixture (3) comprising the fertilizer (3a) and the P-containing fertilizer (3b) and the cation source (1).

In a preferred embodiment, the cation source (1) as defined herein reduces the decomposition of the (thio)phosphoric acid triamide, which is caused by the P-containing fertilizer (3b), as such that after a storage time of up to 15 days at a temperature of 20° C. to 25° C.,
    the (thio)phosphoric acid triamide (2) being provided in a composition comprising the fertilizer mixture (3) comprising the fertilizer (3a) and the P-containing fertilizer (3b) and the cation source (1) exhibits at least 80% of the urease inhibiting efficacy of
    a (thio)phosphoric acid triamide (2) being provided in a composition comprising the fertilizer (3a), but no P-containing fertilizer (3b), and no cation source (1),
    wherein at least 80% of the urease inhibiting efficacy means that the time until a threshold value of ammonia is reached is reduced by at most 20%.

For example, in the case that a threshold value of 600 ppm is reached after 10 days, if the (thio)phosphoric acid triamide (2) is provided in a composition comprising the fertilizer (3a), but no P-containing fertilizer (3b), and no cation source (1), the above embodiment is to be understood as such that the threshold value of 600 ppm is reached at the earliest after 8 days, if the (thio)phosphoric acid triamide (2) is provided in a composition comprising the fertilizer mixture (3) comprising the fertilizer (3a) and the P-containing fertilizer (3b) and the cation source (1).

In an even more preferred embodiment, the cation source (1) as defined herein reduces the decomposition of the (thio)phosphoric acid triamide, which is caused by the P-containing fertilizer (3b), as such that after a storage time of up to 15 days at a temperature of 20° C. to 25° C.,
    the (thio)phosphoric acid triamide (2) being provided in a composition comprising the fertilizer mixture (3) comprising the fertilizer (3a) and the P-containing fertilizer (3b) and the cation source (1) exhibits at least 90% of the urease inhibiting efficacy of
    a (thio)phosphoric acid triamide (2) being provided in a composition comprising the fertilizer (3a), but no P-containing fertilizer (3b), and no cation source (1),
    wherein at least 90% of the urease inhibiting efficacy means that the time until a threshold value of ammonia is reached is reduced by at most 10%.

For example, in the case that a threshold value of 600 ppm is reached after 10 days, if the (thio)phosphoric acid triamide (2) is provided in a composition comprising the fertilizer (3a), but no P-containing fertilizer (3b), and no cation source (1), the above embodiment is to be understood as such that the threshold value of 600 ppm is reached at the earliest after 9 days, if the (thio)phosphoric acid triamide (2) is provided in a composition comprising the fertilizer mixture (3) comprising the fertilizer (3a) and the P-containing fertilizer (3b) and the cation source (1).

In connection with the above embodiments, it is preferred that the storage time is up to 1 month, preferably up to two months or even longer.

Furthermore, it is preferred in connection with the above embodiments that the (thio)phosphoric acid triamide (2) is in each case provided in combination with an amine (4) as defined in detail further below, in order to exclude a destabilizing effect caused by the urea-containing fertilizer (3a), as the amine (4) acts as a stabilizing agent, which prevents decomposition caused by the fertilizer (3a). It is noted, however, that the amine (4) typically does not prevent decomposition caused by the P-containing fertilizer (3b). For this purpose, the cation source (1) is used according to the present invention.

The present invention also relates to a mixture M comprising a cation source (1) and a (thio)phosphoric acid triamide (2). The cation source (1) and the (thio)phosphoric acid triamide (2) have been described in detail above.

In a preferred embodiment, the mixture M further comprises a fertilizer mixture (3) comprising a urea-containing fertilizer (3a) and an additional P-containing fertilizer (3b) which is preferably a NPK fertilizer, a NP fertilizer, a PK fertilizer, or a P fertilizer. The fertilizers (3a) and (3b) have been described in detail above.

The present invention also relates to a granule G comprising a urea-containing fertilizer (3a) and/or a P-containing fertilizer (3b), wherein the granule is coated with a cation source (1). The fertilizers (3a) and (3b) as well as the cation source (1) have been described in detail above.

As used herein, the term "granule" generally refers to particles, which are preferably between two screen sizes usually within the range of 1 to 4 mm. The granules may have a spherical or near-spherical form made by solidification of free-falling droplets in air or other fluid medium (e.g. oil). Apart from the fertilizer, the granule may also comprise a substance to prevent caking or to control the dissolution rate or to improve the physical condition of the granule. The substance may be incorporated in the granule or applied as a layer surrounding the granule. It is to be understood that the fertilizer (3a) and the P-containing fertilizer (3b) may either be provided alone or together in granules. A skilled person is aware that granules may be manufactured granulation of solids, slurries, or melts according to standard processes known in the art.

As used herein, "coated" means that the granule G comprising the fertilizer (3a) and/or (3b) is surface-treated with the cation source (1). The treatment may be performed with the cation source (1) in dry, preferably powdery form, as such that the granule is surrounded by a powder coating. Alternatively, the treatment may be performed by preparing a solution of the cation source (1) and treating the granule with the solution. The solvent of the solution may then be partially or completely evaporated. Preferred solvents in this connection comprise dimethyl sulfoxide (DMSO), dimethylformamide (DMF), water, and combinations thereof. The treatment with the solution may result at least partly in an incorporation of the cation source (1) into the granule.

In a preferred embodiment, the granule is further treated with a (thio)phosphoric acid triamide (2). The (thio)phosphoric acid triamide (2) has been described in detail above.

As used in the context of the granule G, "treated with a (thio)phosphoric acid triamide (2)" means that the granules are surface-treated with the (thio)phosphoric acid triamide (2). In this connection, surface-treatment preferably means that a liquid formulation of the (thio)phosphoric acid triamide (2) has been sprayed onto the granule, so that preferably a coating of the (thio)phosphoric acid triamide (2) surrounding the granule is formed.

It is to be understood that the granule G is either obtained by firstly applying the coating with the cation source (1) and then applying the (thio)phosphoric acid triamide (2) coating or vice versa. The granule G may also comprise a coating comprising both the cation source (1) and the (thio)phosphoric acid triamide (2), which is preferably obtained by simultaneously applying (1) and (2), e.g. in the form of the mixture M as defined herein.

The present invention also relates to a composition B, which comprises a cation source (1), a (thio)phosphoric acid triamide (2), and a fertilizer mixture (3), and is inter alia defined by the process by which the composition is obtainable, wherein 7 options are provided. The cation source (1), the (thio)phosphoric acid triamide (2), and the fertilizer mixture (3) have been described in detail above.

In one embodiment, the composition B is obtainable by
(a1) treating granules comprising the urea-containing fertilizer (3a) and the (thio)phosphoric acid triamide (2) with the cation source (1);
(b1) blending the treated granules of step (a1) with granules comprising the P-containing fertilizer (3b).

In another embodiment, the composition B is obtainable by
(a2) treating granules comprising the P-containing fertilizer (3b) with the cation source (1);
(b2) blending the treated granules of step (a2) with granules comprising the urea-containing fertilizer (3a) and the (thio)phosphoric acid triamide (2).

In another embodiment, the composition B is obtainable by
(a3) blending granules comprising the urea-containing fertilizer (3a) and the (thio)phosphoric acid triamide (2) with granules comprising the P-containing fertilizer (3b); and
(b3) treating the blend of step (a3) with the cation source (1).

In another embodiment, the composition B is obtainable by
(a4) treating granules comprising the fertilizer mixture (3) with the (thio)phosphoric acid triamide (2); and
(b4) treating the treated granules of step (a4) with the cation source (1).

In another embodiment, the composition B is obtainable by
(a5) treating granules comprising the fertilizer mixture (3) with the cation source (1); and
(b5) treating the treated granules of step (a5) with the (thio)phosphoric acid triamide (2).

In another embodiment, the composition B is obtainable by
(a6) providing granules comprising the fertilizer mixture (3); and
(b6) treating the granules of step (a6) with a—solid or liquid—mixture comprising the (thio)phosphoric acid triamide (2) and the cation source (1).

In another embodiment, the composition B is obtainable by
(a7) providing granules comprising the fertilizer mixture (3) and the cation source (1); and
(b7) treating the granules of step (a7) with the (thio)phosphoric acid triamide (2).

Unless otherwise indicated, the term "granule" is to be understood as defined above in connection with the granule G. Where indicated, the granules may in addition to the fertilizer (3a) and/or the P-containing fertilizer (3b) comprise the (thio)phosphoric acid triamide (2). In this case, unless otherwise indicated, the (thio)phosphoric acid triamide (2) may be incorporated in the granule or may be present as a layer surrounding the granule.

As used in the context of the processes by which the composition B is obtainable, "treating granules with the cation source (1)" means that the granules are surface-treated with the cation source (1). The treatment may be performed with the cation source (1) in dry, preferably powdery form, as such that the granule is surrounded by a powder coating. Alternatively, the treatment may be performed by preparing a solution of the cation source (1) and treating the granule with the solution. The solvent of the solution may then be partially or completely evaporated. Preferred solvents in this connection comprise dimethyl sulfoxide (DMSO), dimethylformamide (DMF), water, and combinations thereof. The treatment with the solution may result at least partly in an incorporation of the cation source (1) into the granule.

Similarly, "treating a blend of granules with the cation source (1)" means that the granules of the blend are surface-treated with the cation source (1). The treatment may be performed with the cation source (1) in dry, preferably powdery form, as such that the granules are surrounded by a powder coating. Alternatively, the treatment may be performed by preparing a solution of the cation source (1) and treating the granules with the solution. The solvent of the solution may then be partially or completely evaporated. Preferred solvents in this connection comprise dimethyl sulfoxide (DMSO), dimethylformamide (DMF), water, and combinations thereof. The treatment with the solution may result at least partly in an incorporation of the cation source (1) into the granules.

In case the cation source (1) is $MgSO_4$ when a blend of granules is treated with the cation source (1), magnesium sulfate is preferably used in a powdery form.

In case the cation source (1) is used in a powdery form when a blend of granules is treated with the cation source (1), the average particle size of the cation source (1) is preferably less than 1 mm, more preferably less than 750 µm, most preferably less than 500 µm, particularly preferably less than 250 µm, particularly more preferably less than 150 µm, particularly most preferably less than 100 µm, particularly less than 50 µm. In case the cation source (1) is used in a powdery form when a blend of granules is treated with the cation source (1), the average particle size of the cation source (1) is preferably more than 1 µm, more preferably more than 5 µm, most preferably more than 10 µm, particularly preferably more than 25 µm, particularly more preferably more than 40 µm, particularly most preferably more than 60 µm, particularly more than 90 µm. The average particle size is measured by sieve analysis with different standard set of sieves.

In case the cation source (1) is $MgSO_4$ and used in a powdery form when a blend of granules is treated with the cation source (1), the average particle size of the cation source (1) is preferably less than 1 mm, more preferably less than 750 µm, most preferably less than 500 µm, particularly preferably less than 250 µm, particularly more preferably less than 150 µm, particularly most preferably less than 100 µm, particularly less than 50 µm. In case the cation source (1) is used in a powdery form when a blend of granules is treated with the cation source (1), the average particle size of the cation source (1) is preferably more than 1 µm, more preferably more than 5 µm, most preferably more than 10 µm, particularly preferably more than 25 µm, particularly more preferably more than 40 µm, particularly most preferably more than 60 µm, particularly more than 90 µm. The average particle size is measured by sieve analysis with different standard set of sieves.

In case the cation source (1), particularly $MgSO_4$, is used in a powdery form when a blend of granules is treated with the cation source (1), the adhesion of the cation source (1) on fertilizer granules (particularly granules of urea-containing fertilizer (3a) and/or granules of fertilizer (3b) selected from the group consisting of a NPK fertilizer, a NP fertilizer, a NK fertilizer, a PK fertilizer, a P fertilizer, a K fertilizer, and a N fertilizer) can be improved by adding a sticker, preferably by adding a sticker selected from the group of stickers described in U.S. Pat. No. 5,656,571A or in WO2012/168210 A1 or a polymer sticker or another sticker used in the state of the art for the adhesion of the agrochemical formulation to the seed.

In the context of this invention, a "sticker" is a material or a substance which increases the firmness of attachment of finely-divided solids or other water-soluble or -insoluble materials to a solid surface, and which may be measured in terms of resistance to time or mechanical action. Typically, stickers are substances such as latex or other adhesives that improve attachment of finely-divided solids to a solid surface.

As used in the context of the processes by which the composition B is obtainable, "treating granules with the (thio)phosphoric acid triamide (2)" means that the granules are surface-treated with the (thio)phosphoric acid triamide (2). In this connection, surface-treatment preferably means that a liquid formulation of the (thio)phosphoric acid triamide (2) is sprayed onto the granule, so that preferably a coating of the (thio)phosphoric acid triamide (2) surrounding the granule is formed.

As used in the context of the processes by which the composition B is obtainable, "treating granules with a mixture comprising the (thio)phosphoric acid triamide (2) and the cation source (1)" means that the granules are surface-treated with the corresponding mixture. In this connection, surface-treatment preferably means that a liquid formulation of the (thio)phosphoric acid triamide (2) and the cation source (1) is sprayed onto the granule. In an alternative embodiment, surface-treatment also means that a solid formulation of the (thio)phosphoric acid triamide (2) and the cation source (1) is sprayed onto the granule.

In connection with the above defined use (and the composition A defined in this connection), the method (and the composition A defined in this connection), the mixture M, the granule G, and the composition B according to the invention, it is generally preferred that the (thio)phosphoric acid triamide (2) is provided in combination with at least one amine (4). The amine (4) typically exhibits a stabilizing effect on the (thio)phosphoric acid triamide (2) in terms of a decomposition caused by the urea-containing fertilizer (3a).

Thus, liquid formulations of the (thio)phosphoric acid triamide (2) preferably comprise a (thio)phosphoric acid triamide (2) and an amine (4).

In general, the amine(s) (4) can be any amine, i.e. any chemical compound having at least one amino group, including (but not limited to)
  primary, secondary, and tertiary amines,
  linear, branched, and cyclic amines,
  aliphatic and aromatic amines,
  monomeric, oligomeric and polymeric amines,
  biogenic and non-biogenic amines.

In a preferred embodiment of the invention, the (thio) phosphoric acid triamide (2) is provided in combination with at least one amine (4) selected from the group consisting of
- (4a) a polymeric polyamine; and
- (4b) an amine containing not more than one amino group and at least three alkoxy or hydroxy-substituted $C_2$ to $C_{12}$ alkyl groups $R^{21}$, wherein at least one of the groups $R^{21}$ is different to the other groups $R^{21}$; and
- (4c) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$; and
- (4d) an amine containing at least one saturated or unsaturated $C_8$ to $C_{40}$ alkyl group $R^{23}$; and
- (4e) a saturated or unsaturated heterocyclic amine which contains at least one oxygen atom as ring atom and which does not contain a further alkoxy group; and
- (4f) an amine having a boiling point of more than 100° C., preferably more than 150° C., more preferably more than 200° C. at ambient pressure (1 bar), and
- (4g) a primary amine, and
- (4h) a secondary amine, and
- (4i) a tertiary amine,
- (4j) an amine containing not more than one amino group and at least two alkoxy- or hydroxy-substituted $C_2$ to $C_{12}$ alkyl groups $R^{22}$,
- (4k) an amine containing not more than one amino group and at least three alkoxy- or hydroxy-substituted $C_2$ to $C_{12}$ alkyl groups $R^{22}$,
- (4l) an amine containing not more than one amino group and at least three alkoxy- or hydroxy-substituted $C_2$ to $C_{12}$ alkyl groups $R^{41}$, wherein all groups $R^{41}$ within said amine are identical, and
- (4m) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical, and
- (4n) an amine selected from the group consisting of methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether, and
- (4o) an amine selected from the group consisting of (L10), (L11), (L12), (L13), (L14), (L15), (L16), (L17), (L18), (L19), (L20), (L21), (L22), (L23), (L24) and (L29) as disclosed in the PCT application PCT/IB2015/059864.

According to one embodiment, the amine (4) is
- (4a) a polymeric polyamine.

Generally, (4a) can be any polymeric polyamine, and is preferably a polyalkyleneimine or polyvinylamine, more preferably a polyalkyleneimine, most preferably a polyethyleneimine, polypropyleneimine, or polybutyleneimine, particularly a polyethyleneimine.

According to one embodiment, (4a) is preferably any polymeric polyamine comprising ethyleneimine ($-CH_2CH_2NH-$) as monomeric units, including homopolymers and any copolymers of ethyleneimine, and is preferably a homopolymer of ethyleneimine. Copolymers can be alternating, periodic, statistical or block copolymers.

Generally, (4a) can be of any polymer structure, for example a linear polymer, a ring polymer, a cross-linked polymer, a branched polymer, a star polymer, a comb polymer, a brush polymer, a dendronized polymer, or a dendrimer etc. According to one embodiment, (4a) is an essentially linear polymer, and is preferably a linear polymer.

Polyethyleneimines which may be used are polyethyleneimine homopolymers which may be present in uncrosslinked or crosslinked form. The polyethyleneimine homopolymers can be prepared by known processes, as described, for example, in Römpps (Chemie Lexikon, 8th edition, 1992, pages 3532-3533), or in Ullmanns Enzyklopädie der Technischen Chemie, 4th edition, 1974, vol. 8, pages 212-213. and the literature stated there. They have a molecular weight in the range from about 200 to 1 000 000 g/mol. Corresponding commercial products are for example available under the name Lupasol® from BASF SE.

According to one embodiment of the invention, the polyethyleneimine (4a) is preferably a polyethylenimine having a degree of branching in the range of from 0.1 to 0.95 (also referred to as "highly branched polyethyleneimine"), and more preferably a polyethylenimine having a degree of branching in the range of from 0.25 to 0.90, more preferably a polyethylenimine having a degree of branching in the range of from 0.30 to 0.80, and most preferably a polyethylenimine having a degree of branching in the range of 0.50 to 0.80.

Highly branched polyethyleneimines are characterized by its high degree of branching, which can be determined for example via $^{13}C$-NMR spectroscopy, preferably in $D_2O$, and is defined as follows:

$$\text{Degree of branching} = D + T/D + T + L$$

D (dendritic) equals the percentage of tertiary amino groups, L (linear) equals the percentage of secondary amino groups, and T (terminal) equals the percentage of primary amino groups.

Generally, the polymeric polyamine (4a) can have different weight average molecular weights. The weight average molecular weight of (4a) is preferably at least 200, more preferably at least 400, most preferably at least 550, particularly at least 650, for example at least 750. The weight average molecular weight of (4a) is preferably not more than 10,000, more preferably not more than 4,000, most preferably not more than 1,900, particularly not more than 1,500, for example not more than 1,350. The weight average molecular weight can be determined by standard gel permeation chromatography (GPC) known to the person skilled in the art.

In one embodiment, the amine (4) is a polyethyleneimine, preferably a polyethyleneimine as defined above.

Another class of polyamines includes polymers obtainable by condensation of at least one compound selected from N-(hydroxyalkyl)amines of formulae(I.a) and/or (I.b),

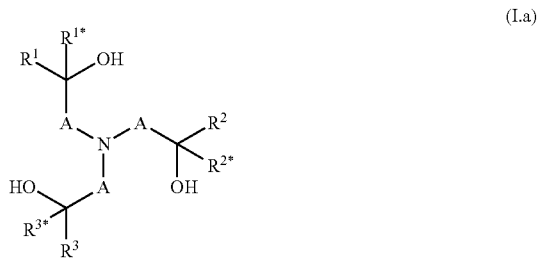

(I.a)

-continued (I.b)

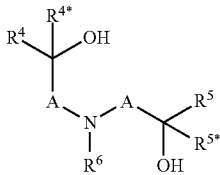

wherein

A are independently selected from $C_1$-$C_6$-alkylene;

$R^1$, $R^{1*}$, $R^2$, $R^{2*}$, $R^3$, $R^{3*}$, $R^4$, $R^{4*}$, $R^5$, and $R^{5*}$ are independently selected of one another selected from hydrogen, alkyl, cycloalkyl or aryl, wherein the at least three mentioned radicals may be optionally substituted; and $R^6$ is selected from hydrogen, alkyl, cycloalkyl or aryl, which may be optionally substituted.

Preferred are polyethanolamines. In this connection, polyethanolamines are preferred, wherein in the condensation product of the compounds of formulae (I.a) and/or (I.b) as defined above, A is $C_1$-alkylene, and $R^1$, $R^{1*}$, $R^2$, $R^{2*}$, $R^3$, $R^{3*}$, $R^4$, $R^{4*}$, $R^5$, and $R^{6*}$ are each H, and $R^6$ is selected from hydrogen and $C_2$-hydroxyalkyl.

In one preferred embodiment, the polyamine is a polyethanolamine, which is commercially available under the trade name Lupasol® EO.

According to another embodiment, the amine (4) is (4b) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$.

The number of groups $R^{21}$ within (4b) is at least 3, preferably 3 to 5, more preferably 3 to 4, and most preferably 3.

The number of carbon atoms in each group $R^{21}$ within (4b) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{21}$.

The groups $R^{21}$ within (4b) are alkoxy- or hydroxy-substituted, preferably hydroxy-substituted. For one amine (4b), among the at least three groups $R^{21}$, at least one of the groups $R^{21}$ is different to the other groups $R^{21}$, preferably one of the groups $R^{21}$ is different to the other groups $R^{21}$.

Preferably at least one of the groups $R^{21}$, more preferably at least two of the groups $R^{21}$, most preferably at least three of the groups $R^{21}$, particularly all groups $R^{21}$ is or are covalently bound to the amino group of the amine (4b).

According to another preferred embodiment, (4b)

is an amine containing not more than one amino group and at least three hydroxy-substituted $C_2$ to $C_8$—or preferably $C_2$ to $C_5$—alkyl groups $R^{21}$, wherein at least one of the groups $R^{21}$ is different to the other groups $R^{21}$, is preferably an amine containing not more than one amino group and at least three hydroxy-substituted $C_2$ to $C_3$ alkyl groups $R^{21}$, wherein at least one of the groups $R^{21}$ is different to the other groups $R^{21}$, is more preferably an amine containing not more than one amino group and three hydroxy-substituted $C_2$ to $C_3$ alkyl groups $R^{21}$ which are covalently bound to the amino group, wherein one of the groups $R^{21}$ is different to the other groups $R^{21}$, and is for example an amine selected from the group consisting of Bis(hydroxyethyl)-isopropanolamine (DEIPA), and 1,1'-((2-Hydroxyethyl)imino)dipropan-2-ol.

According to another preferred embodiment, (4b) is an amine $N(R^{21})_3$ wherein $R^{21}$ is a an alkoxy- or hydroxy-substituted—preferably a hydroxyl-substituted—$C_2$ to $C_{12}$—preferably a $C_2$ to $C_7$, more preferably a $C_2$ to $C_3$-alkyl group and wherein one of the groups $R^{21}$ is different to the other group $R^{21}$.

According to another preferred embodiment, (4b) is an amine $N(R^{21})_3$ wherein $R^{21}$ is a an alkoxy- or hydroxy-substituted—preferably a hydroxyl-substituted—$C_2$ to $C_{12}$—preferably a $C_2$ to $C_7$, more preferably a $C_2$ to $C_3$-alkyl group and wherein one of the groups $R^{21}$ is different to the other group $R^{21}$ and wherein at least one of the groups $R^{21}$ bears the alkoxy or hydroxy substituent at a secondary or tertiary carbon atom.

According to another embodiment, the amine (4) is (4c) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$.

The number of groups $R^{22}$ within (4c) is at least 2, preferably 2 to 5, more preferably 2 to 4, and most preferably 2 to 3, for example 2.

The number of carbon atoms in each group $R^{22}$ within (4c) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{22}$.

The groups $R^{22}$ within (4c) are alkoxy- or hydroxy-substituted, preferably hydroxy-substituted.

For one amine (4c), among the at least two groups $R^{22}$, at least one of the groups $R^{22}$ is different to the other group(s) $R^{22}$, preferably one of the groups $R^{22}$ is different to the other group(s) $R^{22}$.

Preferably at least one of the groups $R^{22}$, more preferably at least two of the groups $R^{22}$, most preferably all groups $R^{22}$ is or are covalently bound to the amino group of the amine (4c).

Preferably at least one of the groups $R^{22}$, more preferably one of the groups $R^{22}$ bears the alkoxy or hydroxy substituent at a secondary or tertiary carbon atom, particularly at a secondary carbon atom.

According to another preferred embodiment, (4c)

is an amine containing not more than one amino group and at least two hydroxy-substituted $C_2$ to $C_7$ alkyl groups $R^{22}$, wherein at least one of the groups $R^{22}$ bears the hydroxy substituent at a secondary or tertiary carbon atom and wherein at least one of the groups $R^{22}$ is different to the other group(s) $R^{22}$, is more preferably an amine containing not more than one amino group and at least two hydroxy-substituted $C_2$ to $C_4$ alkyl groups $R^{22}$, wherein at least one of the groups $R^{22}$ bears the hydroxy substituent at a secondary carbon atom and wherein at least one of the groups $R^{22}$ is different to the other group(s) $R^{22}$, is most preferably an amine containing not more than one amino group and two hydroxy-substituted $C_2$ to $C_3$ alkyl groups $R^{22}$ which are covalently bound to the amino group of the amine (4c), wherein at least one of the groups $R^{22}$ bears the hydroxy substituent at a secondary carbon atom and wherein one of the groups $R^{22}$ is different to the other group $R^{22}$, is for example an amine selected from the group consisting of 1-((2-hydroxyethyl)amino)propan-2-ol, and N-Methyl-N-hydroxyethyl-isopropanolamine.

According to another preferred embodiment, (4c) is an amine $R^{24}N(R^{22})_2$ wherein $R^{24}$ is H or a $C_1$ to $C_{12}$—, preferably a $C_1$ to $C_7$—, more preferably a $C_1$ to $C_3$-alkyl group and $R^{22}$ is an alkoxy- or hydroxy-substituted-, preferably a hydroxy-substituted-$C_2$ to $C_{12}$—, preferably $C_2$ to $C_7$—, more preferably $C_2$ to $C_3$-alkyl group and wherein at least one of the groups $R^{22}$ bears the hydroxy substituent at a secondary carbon atom and wherein one of the groups $R^{22}$ is different to the other group $R^{22}$.

According to another embodiment, the amine (4) is (4d) an amine containing at least one saturated or unsaturated $C_8$ to $C_{40}$ alkyl group $R^{23}$.

The number of carbon atoms in each group $R^{23}$ within (4d) is 8 to 40, preferably 8 to 32, more preferably 8 to 24, most preferably 8 to 19, particularly preferably 8 to 16.

The group $R^{23}$ within (4d) is saturated or unsaturated, preferably unsaturated.

According to another preferred embodiment, (4d) contains at least one alkoxy or hydroxy group, more preferably at least one alkoxy and at least one hydroxy groups, most preferably at least two alkoxy and at least one hydroxyl group, particularly at least four alkoxy and at least one hydroxyl group.

For example, (4d) is an amine selected from the group consisting of: ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).

In one preferred embodiment, the amine (4) is ethoxylated (2) cocoalkylamine.

In one preferred embodiment, the amine (4) is ethoxylated (5) cocoalkylamine.

In one preferred embodiment, the amine (4) is ethoxylated (15) cocoalkylamine.

In one preferred embodiment, the amine (4) is ethoxylated (2) oleylamine.

In one preferred embodiment, the amine (4) is lauryl-dimethylamine.

In one preferred embodiment, the amine (4) is oleyl-dimethylamine.

In one preferred embodiment, the amine (4) is 2-propylheptylamine ethoxylate (5EO).

In one preferred embodiment, the amine (4) is 2-propylheptylamine ethoxylate (10 EO)

In one preferred embodiment, the amine (4) is 2-propylheptylamine ethoxylate (20 EO).

According to another embodiment, the amine (4) is (4e) a saturated or unsaturated heterocyclic amine which contains at least one oxygen atom as ring atom and which does not contain a further alkoxy group.

The term "heterocyclic amine" stands for a heterocyclic compound in which at least one ring atom of the heterocyclic ring is a nitrogen atom.

The heterocyclic amine (4e) is saturated or unsaturated, preferably saturated.

The heterocyclic amine (4e) contains preferably a 5-, 6- or 7-membered heterocyclic ring, more preferably a 5- or 6-membered ring, most preferably a 6-membered ring.

The heterocyclic amine (4e) contains at least one, more preferably 1 to 3, most preferably 1 to 2, particularly one oxygen atom(s) as ring atom(s) of the heterocyclic ring.

The heterocyclic amine (4e) is preferably a morpholine or morpholine derivative, more preferably N-alkyl morpholine, most preferably N-methyl, N-ethyl, N-propyl, or N-butyl morpholine, for example N-methyl morpholine.

In one preferred embodiment, the amine (4) is N-methyl morpholine.

According to another embodiment, the amine (4) is (4f) an amine having a boiling point of more than 100° C., preferably more than 150° C., more preferably more than 200° C. at ambient pressure (1 bar).

Such amines are described in US 2011/0154874 A1. Accordingly, preferred amines (4f) are secondary and/or tertiary amines, for example methyldiethanolamine, tetrahydroxypropylethylenediamine, trimethylaminoethylethanolamine, N,N,N',N'-tetramethyl-1,6-hexanediamine, N,N', N"-tris(dimethylaminopropyl)hexahydrotriazine, and 2,2'-dimorpholinyldiethyl ether.

According to another embodiment, the amine (4) is (4g) a primary amine.

According to another embodiment, the amine (4) is (4h) a secondary amine.

According to another embodiment, the amine (4) is (4i) a tertiary amine.

In connection with the above embodiments relating to (4g), (4h) and (4i), the term "amine" is preferably to be understood as an organic compounds, in which at least one amino group is bound to a carbon atom. In a primary amine, an $NH_2$ group is bound to a carbon atom, in a secondary amine an $NR^AH$ group is bound to a carbon atom, and in a tertiary amine an $NR^AR^B$ group is bound to a carbon atom, wherein $R^A$ and $R^B$ may each individually be selected from $C_1$-$C_{20}$-alkyl, di($C_1$-$C_4$-alkyl)amino-$C_1$-$C_{20}$-alkyl, and a $C_1$-$C_4$-alkylene chain, which is bound to the carbon atom to which the $NR^AH$ or $NR^AR^B$ group is bound so that a heterocyclic ring is formed, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional nitrogen atoms, and wherein the N atoms if present are each individually further substituted by H, $C_1$-$C_4$-alkyl, di($C_1$-$C_4$-alkyl)amino-$C_1$-$C_4$-alkyl, or by a $C_1$-$C_4$-alkylene chain, which is bound to the carbon atom to which the $NR^AR^B$ group is bound, so that a further heterocyclic ring is formed. If the carbon atom to which the $NH_2$, $NR^AH$, or $NR^AR^B$ group is bound is not part of a heterocyclic ring, which is formed with $R^A$ or $R^B$ it is preferably part of a $C_1$-$C_{20}$-alkyl group or a di($C_1$-$C_4$-alkyl)amino-$C_1$-$C_{20}$-alkyl group, so that the amino group may be represented by the formula $C_1$-$C_{20}$-alkyl-$NH_2$, $C_1$-$C_{20}$-alkyl-$NR^AH$, or $C_1$-$C_{20}$-alkyl-$NR^AR^B$ or by the formula di($C_1$-$C_4$-alkyl) amino-$C_1$-$C_{20}$-alkyl-$NH_2$, di($C_1$-$C_4$-alkyl)amino-$C_1$-$C_{20}$-alkyl-$NR^AH$, or di($C_1$-$C_4$-alkyl)amino-$C_1$-$C_{20}$-alkyl-$NR^AR^B$, wherein $R^A$ and $R^B$ may each individually be selected from $C_1$-$C_{20}$-alkyl, and di($C_1$-$C_4$-alkyl)amino-$C_1$-$C_{20}$-alkyl, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional heteroatoms nitrogen atoms, and wherein the N atoms if present are each individually further substituted by H, $C_1$-$C_4$-alkyl, or di($C_1$-$C_4$-alkyl) amino-$C_1$-$C_4$-alkyl.

In one preferred embodiment of the invention, the amine (4) is a tertiary amine, wherein 2 tertiary amino groups are present, and which may be represented by the formula $R^aR^bN$—($C_1$-$C_{10}$alkylene)-$NR^cR^d$, wherein $R^a$, $R^b$, $R^c$, and $R^d$ are independently of each other selected from $C_1$-$C_{10}$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by $C_1$-$C_4$-alkyl. Preferably, $R^a$, $R^b$, $R^c$, and $R^d$ are independently of each other selected from $C_1$-$C_4$-alkyl.

In one embodiment of the invention, the amine (4) is selected from N,N,N',N'-tetramethyl-1,6-hexanediamine, N,N,N',N'-tetramethyl-1,3-propanediamine, N,N',N"-tris(dimethylaminopropyl)hexahydrotriazine, and triethylendiamine (DABCO).

In one preferred embodiment of the invention, the amine (4) is N,N,N',N'-tetramethyl-1,6-hexanediamine (CAS [111-18-2]).

In one preferred embodiment of the invention, the amine (4) is N,N,N',N'-tetramethyl-1,3-propanediamine (CAS [110-95-2]).

In one preferred embodiment of the invention, the amine (4) is N,N',N"-tris(dimethylaminopropyl)hexahydrotriazine.

In one preferred embodiment of the invention, the amine (4) is triethylendiamine (DABCO, available as Lupragen® N201 from BASF).

According to another embodiment, the amine (4) is
(4j) an amine containing not more than one amino group and at least two alkoxy- or hydroxy-substituted $C_2$ to $C_{12}$ alkyl groups $R^{22}$.

According to another embodiment, the amine (4) is
(4k) an amine containing not more than one amino group and at least three alkoxy- or hydroxy-substituted $C_2$ to $C_{12}$ alkyl groups $R^{22}$.

According to another embodiment, the amine (4) is
(4l) an amine containing not more than one amino group and at least three alkoxy- or hydroxy-substituted $C_2$ to $C_{12}$ alkyl groups $R^{41}$, wherein all groups $R^{41}$ within said amine are identical.

According to another embodiment, the amine (4) is
(4m) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.

In the context of the above embodiments (4j) to (4m), the amine (4) may in one embodiment be an amino alcohol.

Amino alcohols may also be referred to as alkanol amines and are characterized in that they comprise at least one hydroxyl group and at least one amino group.

In one embodiment, amino alcohols may be represented by the formula $(H)_aN(C_1$-$C_{10}$-hydroxyalkyl$)_b$, preferably by the formula $(H)_aN(C_1$-$C_8$-hydroxyalkyl$)_b$, wherein a is 0 or 1, and b is 2 when a is 1 and 3 when a is 0. In this connection, it is to be understood that the term "hydroxyalkyl" defines an alkyl group, which comprises at least one, preferably 1, 2, or 3 hydroxyl groups, especially preferably one hydroxyl group. Exemplary hydroxyalkyl groups include hydroxymethyl, 2-hydroxyethyl, 2-hydroxypropyl, and 3-hydroxypropyl.

In one embodiment, it is preferred that the amino alcohol comprises not more than one amino group and at least three hydroxyl substituted $C_2$-$C_8$—, preferably $C_2$—$O_5$-alkyl groups, wherein at least one of these hydroxyl substituted alkyl groups is different from the other hydroxyl substituted alkyl groups.

It is even more preferred that the amino alcohol comprises not more than one amino group and at least three hydroxyl substituted $C_2$-$C_3$-alkyl groups, wherein at least one of these hydroxyl substituted alkyl groups is different from the other hydroxyl substituted alkyl groups.

It is even more preferred that the amino alcohol comprises not more than one amino group and at least three hydroxyl-substituted $C_2$-$C_3$-alkyl groups, which are covalently bound to the amino group, wherein at least one of these hydroxyl substituted alkyl groups is different from the other hydroxyl substituted alkyl groups.

In other embodiments of the invention, amino alcohols may be represented by the generic formula A $(H)_xN((CH_2)_m$—$OH)_n$, wherein m is 1, 2, or 3, x is 0 or 1, and n is 2 when x is 1 and 3 when x is 0, or by generic formula B $(H)_yN((CH_2)$—$CHOH$—$CH_3)_z$, such that the length of the carbon chain where the secondary hydroxyl group is located is 3, y is 0 or 1, and z is 2 when y is 1 and 3 when y is 0.

In another embodiment of the invention, amino alcohols may be represented by the formula $(C_1$-$C_4$-alkyl$)_2N$—$(C_1$-$C_4$-alkylene)-N$(C_1$-$C_4$-alkyl)$(C_1$-$C_4$-hydroxyalkyl). An exemplary amino alcohol in this connection is N,N,N'-trimethylaminoethylethanolamine.

Preferred amino alcohols according to the invention may be selected from the group consisting of ethanolamine, diethanolamine, methyl diethanolamine, butyl diethanolamine, monoisopropanolamine, diisopropanolamine, methyl diisopropanolamine, triethanolamine, tetrahydroxypropylethylenediamine, trimethylaminoethylethanolamine, N,N-bis(2-hydroxyethyl)isopropanolamine, N,N,N'-trimethylaminoethylethanolamine, and N,N,N',N'-tetrakis(2-hydroxypropyl)ethylenediamine.

Preferred amino alcohols according to the invention include ethanolamine, diethanolamine, methyl diethanolamine, butyl diethanolamine, monoisopropanolamine, diisopropanolamine, methyl diisopropanolamine, triethanolamine, tetrahydroxypropylethylenediamine, and trimethylaminoethylethanolamine.

A preferred amino alcohol is triethanolamine.

Another preferred amino alcohol is N,N-bis(2-hydroxyethyl)isopropanolamine, also known as diethanolisopropanolamine (DEIPA).

Another preferred amino alcohol is N,N,N'-trimethylaminoethylethanolamine (CAS [2212-32-0], available as Lupragen® N400 from BASF).

Another preferred amino alcohol is N,N,N',N'-tetrakis(2-hydroxypropyl)ethylenediamine (CAS [102-60-3]).

In the context of the above embodiments (4j) to (4m), the amine (4) may in another embodiment be an ether amine.

Ether amines are characterized in that they comprise at least one ether group and at least one amino group.

In one embodiment of the invention, the ether amines may be represented by the generic formula $NR^aR^b$—$(CH_2)_n[O$—$(CH_2)_m]_p$—$NR^cR^d$, wherein n is 1, 2, 3, 4, or 5, m is 1, 2, 3, 4, or 5, p is 1, 2, 3, 4, or 5, and $R^a$, $R^b$, $R^c$, and $R^d$ are independently of each other selected from H and $C_1$-$C_4$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by H or $C_1$-$C_4$-alkyl. Preferably n is 1 or 2, m is 1 or 2, p is 1 or 2, $R^a$, $R^b$, $R^c$, and $R^d$ are each independently selected from $C_1$-$C_2$-alkyl, or $R^a$ and $R^b$ and $R^c$ and $R^d$ each together with the nitrogen atom to which they are bound form a 5- or 6-membered heterocyclic ring, wherein the heterocycle may comprise 1 additional heteroatom selected from N, O, and S, wherein the N-atom if present is further substituted by a $C_1$-$C_2$-alkyl group.

In one embodiment of the invention, the ether amines are heterocyclic 5- to 10-membered, preferably 5- or 6-membered rings comprising an oxygen atom and a nitrogen atom to form the required amino and ether groups, and wherein the nitrogen atom is further substituted by H, $C_1$-$C_{10}$-alkyl, $C_1$-$C_{10}$-haloalkyl, C(=O)H, or C(=O)$C_1$-$C_{10}$-alkyl. Particularly preferred are morpholine compounds, wherein the nitrogen atom is substituted by $C_1$-$C_4$-alkyl, $C_1$-$C_4$-haloalkyl, C(=O)H, or C(=O)$C_1$-$C_4$-alkyl, preferably by $C_1$-$C_4$-alkyl, C(=O)H, or C(=O)$CH_3$.

Preferred ether amines include dimorpholinodiethylether, bis(2-dimethyl-aminoethyl)ether, N-acetylmorpholine, and N-formylmorpholine.

In one preferred embodiment of the invention, the amine (4) is dimorpholinodiethylether (available as Lupragen® N106 from BASF).

In one preferred embodiment of the invention, the amine (4) is bis(2-dimethyl-aminoethyl)ether (CAS [3033-62-3], available as Lupragen® N205 from BASF).

In one preferred embodiment of the invention, the amine (4) is a morpholine compound selected from N-acetylmorpholine and N-formylmorpholine.

The amines (4l) or (4m) are preferably
(L217) triethanolamine,
(L218) tripropanolamine,
(L219) diisopropanolamine,
(L220) triisopropanolamine,
(L221) diethanolamine, or
(L222) methyldipropanolamine.

In one preferred embodiment, the amine (4) is (L217) triethanolamine.

In another preferred embodiment, the amine (4) is (L218) tripropanolamine.

In another preferred embodiment, the amine (4) is (L219) diisopropanolamine.

In another preferred embodiment, the amine (4) is (L220) triisopropanolamine.

In another preferred embodiment, the amine (4) is (L221) diethanolamine.

In another preferred embodiment, the amine (4) is (L222) methyldipropanolamine.

According to another embodiment, the amine (4) is
(4n) an amine selected from the group consisting of methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether.

In one embodiment, the amine (4) is methyldiethanolamine.

In one embodiment, the amine (4) is tetrahydroxypropylethylenediamine.

In one embodiment, the amine (4) is trimethylaminoethylethanolamine.

In one embodiment, the amine (4) is N,N,N',N'-tetramethyl-1,6-hexanediamine.

In one embodiment, the amine (4) is N,N',N''-tris(dimethylaminopropyl)hexahydrotriazine.

In one embodiment, the amine (4) is 2,2'-dimorpholinyldiethyl ether.

According to another embodiment, the amine (4) is
(4o) an amine selected from the group consisting of (L10), (L11), (L12), (L13), (L14), (L15), (L16), (L17), (L18), (L19), (L20), (L21), (L22), (L23), (L24) and (L29) as disclosed in the PCT application PCT/IB2015/059864.

In one preferred embodiment, the amine (4) is
(L10) an aliphatic alkylenediamine according to the general formula (IA)

(IA)

wherein the radicals are defined as follows:
R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; or
alternatively R1 and R2 jointly represents a linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and
$R3_x$ and $R4_x$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10; and
R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;
z is a value from 2 to 20, preferably from 2 to 12; and
x is an index which can assume all values from 1 to z.

In one preferred embodiment, the amine (4) is
(L11) an oligomeric polyalkyleneamine according to the general formula (II)

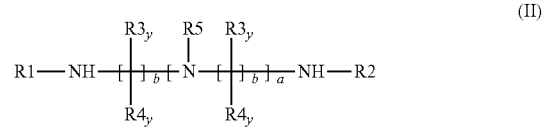

(II)

wherein the radicals are each defined as follows:
R1, R2 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10; or
two of the three radicals R1, R2 and R5 are covalently bonded to each other to form a linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10, and the remaining one of the three radicals R1, R2 and R5 is hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10; and $R3_y$ and $R4_y$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

a is a value of 2 to 5;

b is a value of 2 to 12;

and y is an index which can assume all values between 1 and b.

In one preferred embodiment, the amine (4) is (L12) a polyetheramine according to general formula (III):

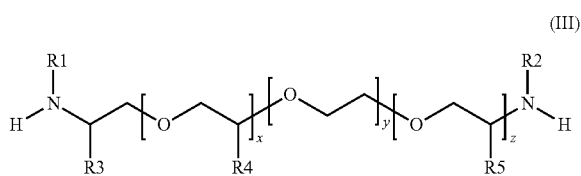

(III)

wherein the radicals are each defined as follows:

R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10;

alternatively R1 and R2 jointly represents a linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and R3, R4 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by 0, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

x, y and z are each independently a value from 0 to 100 and the sum of x, y and z are at least 2.

In one preferred embodiment, the amine (4) is (L13) a polyvinylamine-related polymer selected from the group consisting of (L501) polyvinylamine, (L502) a polyvinylamine according to the general formula (IV)

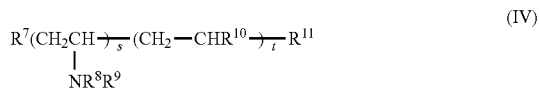

(IV)

which has an average molar mass (Mw) of from 200 to 2,000,000 g/mol and wherein $R^7$ to $R^{11}$ are independently from each other hydrogen, linear or branched $C_1$- to $C_{20}$-alkyl, -alkoxy, -polyoxyethylene, -hydroxyalkyl, -(alkyl)carboxy, -phosphonoalkyl, -alkylamino radicals, formamidyl, pyrrolidonyl-, imidazolyl radicats, $C_2$- to $C_{20}$-alkenyl radicals or $C_6$- to $C_{20}$-aryl, -aryloxy, o-Hydroxybenzoyl, Phthalimidoyl, o-Carboxamidobenzoyl, o-($C_1$- to $C_8$-Alkoxycarbonyl)benzoyl, o-Aminobenzoyl, o-(Mono-$C_1$- to $C_8$-alkylamino)benzoyl, o-(Di-$C_1$- to $C_8$-alkylamino)benzoyl, 2-Cyano-3,3-diphenylacryloyl, or mBenzimidazolyl-p-hydroxybenzoyl radicals which may be optionally further substituted, wherein s is an integer, t is 0 or an integer, wherein the sum of s and t must be chosen in such a way that the average molar mass is within the specified range, (L503) polyallylamine, (L504) poly(diallyldimethylammonium chloride), (L505) cationic polyvinylformamide, (L506) cationic polyvinylpyrrolidone, (L507) cationic polyvinylacetamide, (L508) cationic polyvinylmethylformamide, (L509) cationic polyvinyl methylacetamide, (L510) poly(dimethylaminopropylmethacrylamide), (L511) poly(dimethylaminoethyl acrylate), (L512) poly(diethylaminoethyl acrylate), (L513) poly(acryloylethyltrimethylammonium chloride), (L514) poly(acrylamido propyltrimethylammonium chloride), (L515) poly(methacrylamidotripropyltrimethyla-mmonium chloride), (L516) cationic polyacrylamide, (L517) poly(vinylpyridine), (L518) hexadimethrine bromide, (L519) poly(dimethylamine-co-epichlorohydrin), (L520) poly(dimethylamine-co-epichlorohydrin-co-ethylenediamine), (L521) poly(amidoamine-epichlorohydrin), (L522) linear, branched or hyperbranched polyamidoamines, or (L523) polyamidoamines having an average molar mass (MW) of from 1,000 to 200,000 g/mol, and (L524) cationic starch, or copolymers which contain N-vinylformamide, allylamine, diallyldimethylammonium chloride, N-vinylacetamide, N-vinylpyrrolidone, N-methyl-N-vinylformamide, N-methyl-N-vinylacetamide, dimethylaminopropylmethacrylamide, dimethylaminoethyl acrylate, diethylaminoethyl acrylate, acryloylethyltrimethylammonium chloride or methacrylamidopropyltrimethylammonium chloride in the form of polymerized units and, if desired, in cleaved form, and the salts thereof when the polymers are basic polymers.

In one preferred embodiment, the amine (4) is (L14) a polyethyleneimine according to the general formula (V)

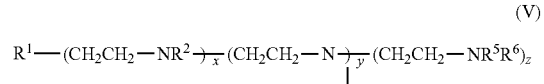

(V)

which has an average molar mass (MW) of from 200 to 1,000,000 g/mol and in which $R^1$ to $R^6$ are—independently from each other—hydrogen, linear or branched $C_1$- to $C_{20}$-alkyl, -alkoxy, -polyoxyalkylene, -polyoxyethylene, -hydroxyalkyl, -(alkyl)carboxy, -phosphonoalkyl, -alkylamino radicals, $C_2$- to $C_{20}$-alkenyl radicals or $C_6$- to $C_{20}$-aryl, -aryloxy, -hydroxyaryl, -arylcarboxy or -arylamino radicals which are optionally further substituted, and $R^2$, $R^3$ and $R^5$ may—independently from each other—optionally be each additionally further polyethyleneimine polymer chains, and $R^1$ may optionally be an $NR^3R^4$ or an $NH_2$ radical, and x, y and z are—independently from each other—0 or an integer, wherein the sum of x, y and z must be chosen in such a way that the average molar mass is within the specified range.

In one preferred embodiment, the amine (4) is (L15) a polyethyleneimine according to the general formula (V) wherein at least one of the radicals $R^2$ to $R^6$ is a polyoxyalkylene radical.

In one preferred embodiment, the amine (4) is a polymer obtainable by the process (L16P) comprising the step L16a)

L16a) condensation of at least one compound selected from N-(hydroxyalkyl)amines of formulae (I.a) and/or (I.b),

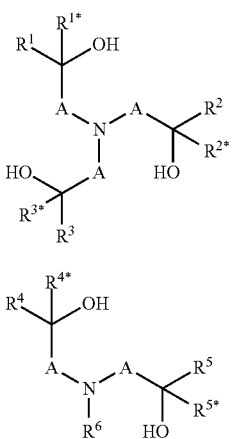

(I.a)

(I.b)

wherein

A are independently selected from $C_1$-$C_6$-alkylene;

$R^1$, $R^{1*}$, $R^2$, $R^{2*}$, $R^3$, $R^{3*}$, $R^4$, $R^{4*}$, $R^5$ and $R^{5*}$ are independently of one another selected from hydrogen, alkyl, cycloalkyl or aryl, wherein the last three mentioned radicals may be optionally substituted; and $R^6$ is selected from hydrogen, alkyl, cycloalkyl or aryl, which may be optionally substituted.

In one preferred embodiment, the amine (4) is (L17) a polymer obtainable by the process (L17P) comprising the two steps L17a) and L17b)

L17a) condensation of at least one compound selected from N-(hydroxyalkyl)amines of formulae (I.a) and/or (I.b),

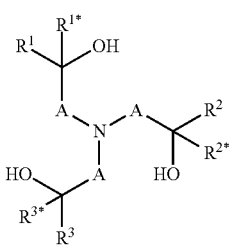

(I.a)

(I.b)

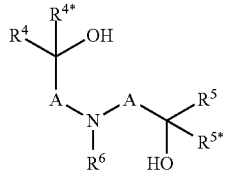

wherein

A are independently selected from $C_1$-$C_6$-alkylene;

$R^1$, $R^{1*}$, $R^2$, $R^{2*}$, $R^3$, $R^{3*}$, $R^4$, $R^{4*}$, $R^5$ and $R^{5*}$ are independently of one another selected from hydrogen, alkyl, cycloalkyl or aryl, wherein the last three mentioned radicals may be optionally substituted; and $R^6$ is selected from hydrogen, alkyl, cycloalkyl or aryl, which may be optionally substituted; and L17b) reacting at least a part of the remaining hydroxy groups and/or, if present, at least a part of the secondary amino groups of the polyether provided in step L17a) with at least one alkylene oxide.

In one preferred embodiment, the amine (4) is (L18) a derivative obtainable by quaternization, protonation, sulphation and/or phosphation of the polymer (L16) or (L17).

In one preferred embodiment, the amine (4) is (L19) dendritic polyamines or their precursors selected from (L554) N,N,N',N'-tetraaminopropylalkylenediamine, (L555) dendritic amines obtainable from N,N,N',N'-tetraaminopropylalkylenediamine by amino-n-propylation (for example known as N14-, N30-, N62- and N128-amine according to the number of their nitrogen atoms), (L556) N,N,N',N'-tetraaminopropylethylenediamine, (L557) dendritic amines obtainable from N,N,N',N'-tetraaminopropylethylenediamine by amino-n-propylation (for example known as N14-, N30-, N62- and N128-amine according to the number of their nitrogen atoms), (L558) N,N,N',N'-tetraaminopropylpropylenediamine, (L559) dendritic amines obtainable from N,N,N',N'-tetraaminopropylpropylenediamine by amino-n-propylation (for example known as N14-, N30-, N62- and N128-amine according to the number of their nitrogen atoms), (L560) N,N,N',N'-tetraaminopropylbutylenediamine, (L561) dendritic amines obtainable from N,N,N',N'-tetraaminopropylbutylenediamine by amino-n-propylation (for example known as N14-, N30-, N62- and N128-amine according to the number of their nitrogen atoms).

In one preferred embodiment, the amine (4) is (L20) a bicyclic, tricyclic or higher polycyclic polyamine.

In one preferred embodiment, the amine (4) is (L21) an amine containing not more than one amino group and two alkoxy- or hydroxy-substituted C2 to C12 alkyl groups R21a and one C1 to C10 alkyl group R21b, wherein the R21a group bears the alkoxy or hydroxy substituent at a secondary or tertiary carbon atom and wherein the two groups R21a are identical.

In one preferred embodiment, the amine (4) is (L22) an amine containing not more than one amino group and one alkoxy- or hydroxy-substituted $C_2$ to $C_{12}$ alkyl group $R^{22a}$ and two $C_1$ to $C_{10}$ alkyl groups $R^{22b}$, wherein the two groups $R^{22b}$ are identical.

In one preferred embodiment, the amine (4) is (L23) an imidazolidinone N-substituted on one or two of its nitrogen atoms with alkyl groups $R^{23}$ wherein $R^{23}$ may optionally be substituted with OH groups.

In one preferred embodiment, the amine (4) is (L24) a morpholine N-substituted with alkyl groups $R^{24}$ wherein $R^{24}$ may optionally be substituted with OH groups.

In one preferred embodiment, the amine (4) is (L29) a homopolymer of amino acids.

In connection with the use (and the composition A defined in this connection), the method (and the composition A defined in this connection), the mixture M, the granule G, and the composition B as defined herein, the following combinations of embodiments are particularly preferred according to the present invention.

Preferred combinations of the cation source (1) and the (thio)phosphoric acid triamide (2) are defined in the following Table A.

TABLE A

| (1) + (2) | (1) | (2) |
|---|---|---|
| A-1 | $CaCl_2$ | NBPT |
| A-2 | $CaCl_2$ | NPPT |
| A-3 | $CaCl_2$ | NBPT + NPPT |
| A-4 | $MgSO_4$ | NBPT |
| A-5 | $MgSO_4$ | NPPT |
| A-6 | $MgSO_4$ | NBPT + NPPT |
| A-7 | $Al_2(SO_4)_3$ | NBPT |
| A-8 | $Al_2(SO_4)_3$ | NPPT |
| A-9 | $Al_2(SO_4)_3$ | NBPT + NPPT |
| A-10 | $FeSO_4$ | NBPT |
| A-11 | $FeSO_4$ | NPPT |
| A-12 | $FeSO_4$ | NBPT + NPPT |
| A-13 | $ZnCl_2$ | NBPT |
| A-14 | $ZnCl_2$ | NPPT |
| A-15 | $ZnCl_2$ | NBPT + NPPT |
| A-16 | $ZnSO_4$ | NBPT |
| A-17 | $ZnSO_4$ | NPPT |
| A-18 | $ZnSO_4$ | NBPT + NPPT |
| A-19 | $CuSO_4$, | NBPT |
| A-20 | $CuSO_4$, | NPPT |
| A-21 | $CuSO_4$, | NBPT + NPPT |
| A-22 | $Ca(NO_3)_2$ | NBPT |
| A-23 | $Ca(NO_3)_2$ | NPPT |
| A-24 | $Ca(NO_3)_2$ | NBPT + NPPT |

Preferred combinations of the cation source (1) and the fertilizer (3a) are defined in the following Table B.

TABLE B

| (1) + (3a) | (1) | (3a) |
|---|---|---|
| B-1 | $CaCl_2$ | U |
| B-2 | $MgSO_4$ | U |
| B-3 | $Al_2(SO_4)_3$ | U |
| B-4 | $FeSO_4$ | U |
| B-5 | $ZnCl_2$ | U |
| B-6 | $ZnSO_4$ | U |
| B-7 | $CuSO_4$, | U |
| B-8 | $Ca(NO_3)_2$ | U |

U = urea

Preferred combinations of the cation source (1) and the P-containing fertilizer (3b) are defined in the following Table C.

TABLE C

| (1) + (3b) | (1) | (3b) |
|---|---|---|
| C-1 | $CaCl_2$ | MAP |
| C-2 | $CaCl_2$ | DAP |
| C-3 | $CaCl_2$ | CP |
| C-4 | $CaCl_2$ | SP |
| C-5 | $CaCl_2$ | DSP |
| C-6 | $CaCl_2$ | TSP |
| C-7 | $CaCl_2$ | PR |
| C-8 | $CaCl_2$ | APP |
| C-9 | $MgSO_4$ | MAP |
| C-10 | $MgSO_4$ | DAP |
| C-11 | $MgSO_4$ | CP |
| C-12 | $MgSO_4$ | SP |
| C-13 | $MgSO_4$ | DSP |
| C-14 | $MgSO_4$ | TSP |
| C-15 | $MgSO_4$ | PR |
| C-16 | $MgSO_4$ | APP |
| C-17 | $Al_2(SO_4)_3$ | MAP |
| C-18 | $Al_2(SO_4)_3$ | DAP |
| C-19 | $Al_2(SO_4)_3$ | CP |
| C-20 | $Al_2(SO_4)_3$ | SP |
| C-21 | $Al_2(SO_4)_3$ | DSP |
| C-22 | $Al_2(SO_4)_3$ | TSP |
| C-23 | $Al_2(SO_4)_3$ | PR |
| C-24 | $Al_2(SO_4)_3$ | APP |
| C-25 | $FeSO_4$ | MAP |
| C-26 | $FeSO_4$ | DAP |
| C-27 | $FeSO_4$ | CP |
| C-28 | $FeSO_4$ | SP |
| C-29 | $FeSO_4$ | DSP |
| C-30 | $FeSO_4$ | TSP |
| C-31 | $FeSO_4$ | PR |
| C-32 | $FeSO_4$ | APP |
| C-33 | $ZnCl_2$ | MAP |
| C-34 | $ZnCl_2$ | DAP |
| C-35 | $ZnCl_2$ | CP |
| C-36 | $ZnCl_2$ | SP |
| C-37 | $ZnCl_2$ | DSP |
| C-38 | $ZnCl_2$ | TSP |
| C-39 | $ZnCl_2$ | PR |
| C-40 | $ZnCl_2$ | APP |
| C-41 | $ZnSO_4$ | MAP |
| C-42 | $ZnSO_4$ | DAP |
| C-43 | $ZnSO_4$ | CP |
| C-44 | $ZnSO_4$ | SP |
| C-45 | $ZnSO_4$ | DSP |
| C-46 | $ZnSO_4$ | TSP |
| C-47 | $ZnSO_4$ | PR |
| C-48 | $ZnSO_4$ | APP |
| C-49 | $CuSO_4$ | MAP |
| C-50 | $CuSO_4$ | DAP |
| C-51 | $CuSO_4$ | CP |
| C-52 | $CuSO_4$ | SP |
| C-53 | $CuSO_4$ | DSP |
| C-54 | $CuSO_4$ | TSP |
| C-55 | $CuSO_4$ | PR |
| C-56 | $CuSO_4$ | APP |
| C-57 | $Ca(NO_3)_2$ | MAP |
| C-58 | $Ca(NO_3)_2$ | DAP |
| C-59 | $Ca(NO_3)_2$ | CP |
| C-60 | $Ca(NO_3)_2$ | SP |
| C-61 | $Ca(NO_3)_2$ | DSP |
| C-62 | $Ca(NO_3)_2$ | TSP |
| C-63 | $Ca(NO_3)_2$ | PR |
| C-64 | $Ca(NO_3)_2$ | APP |

CP = calcium phosphate
SP = super phosphate
DSP = double super phosphate
PR = phosphate rock The remaining abbreviations correspond to the abbreviations used before.

Preferred combinations of the cation source (1) and the fertilizers (3a) and (3b) are defined in the following Table D.

TABLE D

| (1) + (3a)/(3b) | (1) | (3a) | (3b) |
|---|---|---|---|
| D-1 | CaCl$_2$ | U | MAP |
| D-2 | CaCl$_2$ | U | DAP |
| D-3 | CaCl$_2$ | U | CP |
| D-4 | CaCl$_2$ | U | SP |
| D-5 | CaCl$_2$ | U | DSP |
| D-6 | CaCl$_2$ | U | TSP |
| D-7 | CaCl$_2$ | U | PR |
| D-8 | CaCl$_2$ | U | APP |
| D-9 | MgSO$_4$ | U | MAP |
| D-10 | MgSO$_4$ | U | DAP |
| D-11 | MgSO$_4$ | U | CP |
| D-12 | MgSO$_4$ | U | SP |
| D-13 | MgSO$_4$ | U | DSP |
| D-14 | MgSO$_4$ | U | TSP |
| D-15 | MgSO$_4$ | U | PR |
| D-16 | MgSO$_4$ | U | APP |
| D-17 | Al$_2$(SO$_4$)$_3$ | U | MAP |
| D-18 | Al$_2$(SO$_4$)$_3$ | U | DAP |
| D-19 | Al$_2$(SO$_4$)$_3$ | U | CP |
| D-20 | Al$_2$(SO$_4$)$_3$ | U | SP |
| D-21 | Al$_2$(SO$_4$)$_3$ | U | DSP |
| D-22 | Al$_2$(SO$_4$)$_3$ | U | TSP |
| D-23 | Al$_2$(SO$_4$)$_3$ | U | PR |
| D-24 | Al$_2$(SO$_4$)$_3$ | U | APP |
| D-25 | FeSO$_4$ | U | MAP |
| D-26 | FeSO$_4$ | U | DAP |
| D-27 | FeSO$_4$ | U | CP |
| D-28 | FeSO$_4$ | U | SP |
| D-29 | FeSO$_4$ | U | DSP |
| D-30 | FeSO$_4$ | U | TSP |
| D-31 | FeSO$_4$ | U | PR |
| D-32 | FeSO$_4$ | U | APP |
| D-33 | ZnCl$_2$ | U | MAP |
| D-34 | ZnCl$_2$ | U | DAP |
| D-35 | ZnCl$_2$ | U | CP |
| D-36 | ZnCl$_2$ | U | SP |
| D-37 | ZnCl$_2$ | U | DSP |
| D-38 | ZnCl$_2$ | U | TSP |
| D-39 | ZnCl$_2$ | U | PR |
| D-40 | ZnCl$_2$ | U | APP |
| D-41 | ZnSO$_4$ | U | MAP |
| D-42 | ZnSO$_4$ | U | DAP |
| D-43 | ZnSO$_4$ | U | CP |
| D-44 | ZnSO$_4$ | U | SP |
| D-45 | ZnSO$_4$ | U | DSP |
| D-46 | ZnSO$_4$ | U | TSP |
| D-47 | ZnSO$_4$ | U | PR |
| D-48 | ZnSO$_4$ | U | APP |
| D-49 | CuSO$_4$ | U | MAP |
| D-50 | CuSO$_4$ | U | DAP |
| D-51 | CuSO$_4$ | U | CP |
| D-52 | CuSO$_4$ | U | SP |
| D-53 | CuSO$_4$ | U | DSP |
| D-54 | CuSO$_4$ | U | TSP |
| D-55 | CuSO$_4$ | U | PR |
| D-56 | CuSO$_4$ | U | APP |
| D-57 | Ca(NO$_3$)$_2$ | U | MAP |
| D-58 | Ca(NO$_3$)$_2$ | U | DAP |
| D-59 | Ca(NO$_3$)$_2$ | U | CP |
| D-60 | Ca(NO$_3$)$_2$ | U | SP |
| D-61 | Ca(NO$_3$)$_2$ | U | DSP |
| D-62 | Ca(NO$_3$)$_2$ | U | TSP |
| D-63 | Ca(NO$_3$)$_2$ | U | PR |
| D-64 | Ca(NO$_3$)$_2$ | U | APP |

The abbreviations are the same as used in Tables B and C.

Preferred combinations of the cation source (1), the (thio)phosphoric acid triamide (2), and the fertilizers (3a) and (3b) are defined in the following Table E. In Table E, "NBPT+NPPT" is abbreviated as "NYPT".

TABLE E

| (1) + (2) + (3a)/(3b) | (1) | (2) | (3a) | (3b) |
|---|---|---|---|---|
| E-1 | CaCl$_2$ | NBPT | U | MAP |
| E-2 | CaCl$_2$ | NBPT | U | DAP |
| E-3 | CaCl$_2$ | NBPT | U | CP |
| E-4 | CaCl$_2$ | NBPT | U | SP |
| E-5 | CaCl$_2$ | NBPT | U | DSP |
| E-6 | CaCl$_2$ | NBPT | U | TSP |
| E-7 | CaCl$_2$ | NBPT | U | PR |
| E-8 | CaCl$_2$ | NBPT | U | APP |
| E-9 | CaCl$_2$ | NBPT | U | MAP |
| E-10 | CaCl$_2$ | NBPT | U | DAP |
| E-11 | CaCl$_2$ | NBPT | U | CP |
| E-12 | CaCl$_2$ | NBPT | U | SP |
| E-13 | CaCl$_2$ | NBPT | U | DSP |
| E-14 | CaCl$_2$ | NBPT | U | TSP |
| E-15 | CaCl$_2$ | NBPT | U | PR |
| E-16 | CaCl$_2$ | NBPT | U | APP |
| E-17 | MgSO$_4$ | NBPT | U | MAP |
| E-18 | MgSO$_4$ | NBPT | U | DAP |
| E-19 | MgSO$_4$ | NBPT | U | CP |
| E-20 | MgSO$_4$ | NBPT | U | SP |
| E-21 | MgSO$_4$ | NBPT | U | DSP |
| E-22 | MgSO$_4$ | NBPT | U | TSP |
| E-23 | MgSO$_4$ | NBPT | U | PR |
| E-24 | MgSO$_4$ | NBPT | U | APP |
| E-25 | MgSO$_4$ | NBPT | U | MAP |
| E-26 | MgSO$_4$ | NBPT | U | DAP |
| E-27 | MgSO$_4$ | NBPT | U | CP |
| E-28 | MgSO$_4$ | NBPT | U | SP |
| E-29 | MgSO$_4$ | NBPT | U | DSP |
| E-30 | MgSO$_4$ | NBPT | U | TSP |
| E-31 | MgSO$_4$ | NBPT | U | PR |
| E-32 | MgSO$_4$ | NBPT | U | APP |
| E-33 | CaCl$_2$ | NPPT | U | MAP |
| E-34 | CaCl$_2$ | NPPT | U | DAP |
| E-35 | CaCl$_2$ | NPPT | U | CP |
| E-36 | CaCl$_2$ | NPPT | U | SP |
| E-37 | CaCl$_2$ | NPPT | U | DSP |
| E-38 | CaCl$_2$ | NPPT | U | TSP |
| E-39 | CaCl$_2$ | NPPT | U | PR |
| E-40 | CaCl$_2$ | NPPT | U | APP |
| E-41 | CaCl$_2$ | NPPT | U | MAP |
| E-42 | CaCl$_2$ | NPPT | U | DAP |
| E-43 | CaCl$_2$ | NPPT | U | CP |
| E-44 | CaCl$_2$ | NPPT | U | SP |
| E-45 | CaCl$_2$ | NPPT | U | DSP |
| E-46 | CaCl$_2$ | NPPT | U | TSP |
| E-47 | CaCl$_2$ | NPPT | U | PR |
| E-48 | CaCl$_2$ | NPPT | U | APP |
| E-49 | MgSO$_4$ | NPPT | U | MAP |
| E-50 | MgSO$_4$ | NPPT | U | DAP |
| E-51 | MgSO$_4$ | NPPT | U | CP |
| E-52 | MgSO$_4$ | NPPT | U | SP |
| E-53 | MgSO$_4$ | NPPT | U | DSP |
| E-54 | MgSO$_4$ | NPPT | U | TSP |
| E-55 | MgSO$_4$ | NPPT | U | PR |
| E-56 | MgSO$_4$ | NPPT | U | APP |
| E-57 | MgSO$_4$ | NPPT | U | MAP |
| E-58 | MgSO$_4$ | NPPT | U | DAP |
| E-59 | MgSO$_4$ | NPPT | U | CP |
| E-60 | MgSO$_4$ | NPPT | U | SP |
| E-61 | MgSO$_4$ | NPPT | U | DSP |
| E-62 | MgSO$_4$ | NPPT | U | TSP |
| E-63 | MgSO$_4$ | NPPT | U | PR |
| E-64 | MgSO$_4$ | NPPT | U | APP |
| E-65 | CaCl$_2$ | NYPT | U | MAP |
| E-66 | CaCl$_2$ | NYPT | U | DAP |
| E-67 | CaCl$_2$ | NYPT | U | CP |
| E-68 | CaCl$_2$ | NYPT | U | SP |
| E-69 | CaCl$_2$ | NYPT | U | DSP |
| E-70 | CaCl$_2$ | NYPT | U | TSP |
| E-71 | CaCl$_2$ | NYPT | U | PR |
| E-72 | CaCl$_2$ | NYPT | U | APP |
| E-73 | CaCl$_2$ | NYPT | U | MAP |
| E-74 | CaCl$_2$ | NYPT | U | DAP |
| E-75 | CaCl$_2$ | NYPT | U | CP |
| E-76 | CaCl$_2$ | NYPT | U | SP |
| E-77 | CaCl$_2$ | NYPT | U | DSP |

TABLE E-continued

| (1) + (2) + (3a)/(3b) | (1) | (2) | (3a) | (3b) |
|---|---|---|---|---|
| E-78 | CaCl$_2$ | NYPT | U | TSP |
| E-79 | CaCl$_2$ | NYPT | U | PR |
| E-80 | CaCl$_2$ | NYPT | U | APP |
| E-81 | MgSO$_4$ | NYPT | U | MAP |
| E-82 | MgSO$_4$ | NYPT | U | DAP |
| E-83 | MgSO$_4$ | NYPT | U | CP |
| E-84 | MgSO$_4$ | NYPT | U | SP |
| E-85 | MgSO$_4$ | NYPT | U | DSP |
| E-86 | MgSO$_4$ | NYPT | U | TSP |
| E-87 | MgSO$_4$ | NYPT | U | PR |
| E-88 | MgSO$_4$ | NYPT | U | APP |
| E-89 | MgSO$_4$ | NYPT | U | MAP |
| E-90 | MgSO$_4$ | NYPT | U | DAP |
| E-91 | MgSO$_4$ | NYPT | U | CP |
| E-92 | MgSO$_4$ | NYPT | U | SP |
| E-93 | MgSO$_4$ | NYPT | U | DSP |
| E-94 | MgSO$_4$ | NYPT | U | TSP |
| E-95 | MgSO$_4$ | NYPT | U | PR |
| E-96 | MgSO$_4$ | NYPT | U | APP |
| E-97 | Al$_2$(SO$_4$)$_3$ | NBPT | U | MAP |
| E-98 | Al$_2$(SO$_4$)$_3$ | NBPT | U | DAP |
| E-99 | Al$_2$(SO$_4$)$_3$ | NBPT | U | CP |
| E-100 | Al$_2$(SO$_4$)$_3$ | NBPT | U | SP |
| E-101 | Al$_2$(SO$_4$)$_3$ | NBPT | U | DSP |
| E-102 | Al$_2$(SO$_4$)$_3$ | NBPT | U | TSP |
| E-103 | Al$_2$(SO$_4$)$_3$ | NBPT | U | PR |
| E-104 | Al$_2$(SO$_4$)$_3$ | NBPT | U | APP |
| E-105 | Al$_2$(SO$_4$)$_3$ | NBPT | U | MAP |
| E-106 | Al$_2$(SO$_4$)$_3$ | NBPT | U | DAP |
| E-107 | Al$_2$(SO$_4$)$_3$ | NBPT | U | CP |
| E-108 | Al$_2$(SO$_4$)$_3$ | NBPT | U | SP |
| E-109 | Al$_2$(SO$_4$)$_3$ | NBPT | U | DSP |
| E-110 | Al$_2$(SO$_4$)$_3$ | NBPT | U | TSP |
| E-111 | Al$_2$(SO$_4$)$_3$ | NBPT | U | PR |
| E-112 | Al$_2$(SO$_4$)$_3$ | NBPT | U | APP |
| E-113 | FeSO$_4$ | NBPT | U | MAP |
| E-114 | FeSO$_4$ | NBPT | U | DAP |
| E-115 | FeSO$_4$ | NBPT | U | CP |
| E-116 | FeSO$_4$ | NBPT | U | SP |
| E-117 | FeSO$_4$ | NBPT | U | DSP |
| E-118 | FeSO$_4$ | NBPT | U | TSP |
| E-119 | FeSO$_4$ | NBPT | U | PR |
| E-120 | FeSO$_4$ | NBPT | U | APP |
| E-121 | FeSO$_4$ | NBPT | U | MAP |
| E-122 | FeSO$_4$ | NBPT | U | DAP |
| E-123 | FeSO$_4$ | NBPT | U | CP |
| E-124 | FeSO$_4$ | NBPT | U | SP |
| E-125 | FeSO$_4$ | NBPT | U | DSP |
| E-126 | FeSO$_4$ | NBPT | U | TSP |
| E-127 | FeSO$_4$ | NBPT | U | PR |
| E-128 | FeSO$_4$ | NBPT | U | APP |
| E-129 | Al$_2$(SO$_4$)$_3$ | NPPT | U | MAP |
| E-130 | Al$_2$(SO$_4$)$_3$ | NPPT | U | DAP |
| E-131 | Al$_2$(SO$_4$)$_3$ | NPPT | U | CP |
| E-132 | Al$_2$(SO$_4$)$_3$ | NPPT | U | SP |
| E-133 | Al$_2$(SO$_4$)$_3$ | NPPT | U | DSP |
| E-134 | Al$_2$(SO$_4$)$_3$ | NPPT | U | TSP |
| E-135 | Al$_2$(SO$_4$)$_3$ | NPPT | U | PR |
| E-136 | Al$_2$(SO$_4$)$_3$ | NPPT | U | APP |
| E-137 | Al$_2$(SO$_4$)$_3$ | NPPT | U | MAP |
| E-138 | Al$_2$(SO$_4$)$_3$ | NPPT | U | DAP |
| E-139 | Al$_2$(SO$_4$)$_3$ | NPPT | U | CP |
| E-140 | Al$_2$(SO$_4$)$_3$ | NPPT | U | SP |
| E-141 | Al$_2$(SO$_4$)$_3$ | NPPT | U | DSP |
| E-142 | Al$_2$(SO$_4$)$_3$ | NPPT | U | TSP |
| E-143 | Al$_2$(SO$_4$)$_3$ | NPPT | U | PR |
| E-144 | Al$_2$(SO$_4$)$_3$ | NPPT | U | APP |
| E-145 | FeSO$_4$ | NPPT | U | MAP |
| E-146 | FeSO$_4$ | NPPT | U | DAP |
| E-147 | FeSO$_4$ | NPPT | U | CP |
| E-148 | FeSO$_4$ | NPPT | U | SP |
| E-149 | FeSO$_4$ | NPPT | U | DSP |
| E-150 | FeSO$_4$ | NPPT | U | TSP |
| E-151 | FeSO$_4$ | NPPT | U | PR |
| E-152 | FeSO$_4$ | NPPT | U | APP |
| E-153 | FeSO$_4$ | NPPT | U | MAP |
| E-154 | FeSO$_4$ | NPPT | U | DAP |
| E-155 | FeSO$_4$ | NPPT | U | CP |
| E-156 | FeSO$_4$ | NPPT | U | SP |
| E-157 | FeSO$_4$ | NPPT | U | DSP |
| E-158 | FeSO$_4$ | NPPT | U | TSP |
| E-159 | FeSO$_4$ | NPPT | U | PR |
| E-160 | FeSO$_4$ | NPPT | U | APP |
| E-161 | Al$_2$(SO$_4$)$_3$ | NYPT | U | MAP |
| E-162 | Al$_2$(SO$_4$)$_3$ | NYPT | U | DAP |
| E-163 | Al$_2$(SO$_4$)$_3$ | NYPT | U | CP |
| E-164 | Al$_2$(SO$_4$)$_3$ | NYPT | U | SP |
| E-165 | Al$_2$(SO$_4$)$_3$ | NYPT | U | DSP |
| E-166 | Al$_2$(SO$_4$)$_3$ | NYPT | U | TSP |
| E-167 | Al$_2$(SO$_4$)$_3$ | NYPT | U | PR |
| E-168 | Al$_2$(SO$_4$)$_3$ | NYPT | U | APP |
| E-169 | Al$_2$(SO$_4$)$_3$ | NYPT | U | MAP |
| E-170 | Al$_2$(SO$_4$)$_3$ | NYPT | U | DAP |
| E-171 | Al$_2$(SO$_4$)$_3$ | NYPT | U | CP |
| E-172 | Al$_2$(SO$_4$)$_3$ | NYPT | U | SP |
| E-173 | Al$_2$(SO$_4$)$_3$ | NYPT | U | DSP |
| E-174 | Al$_2$(SO$_4$)$_3$ | NYPT | U | TSP |
| E-175 | Al$_2$(SO$_4$)$_3$ | NYPT | U | PR |
| E-176 | Al$_2$(SO$_4$)$_3$ | NYPT | U | APP |
| E-177 | FeSO$_4$ | NYPT | U | MAP |
| E-178 | FeSO$_4$ | NYPT | U | DAP |
| E-179 | FeSO$_4$ | NYPT | U | CP |
| E-180 | FeSO$_4$ | NYPT | U | SP |
| E-181 | FeSO$_4$ | NYPT | U | DSP |
| E-182 | FeSO$_4$ | NYPT | U | TSP |
| E-183 | FeSO$_4$ | NYPT | U | PR |
| E-184 | FeSO$_4$ | NYPT | U | APP |
| E-185 | FeSO$_4$ | NYPT | U | MAP |
| E-186 | FeSO$_4$ | NYPT | U | DAP |
| E-187 | FeSO$_4$ | NYPT | U | CP |
| E-188 | FeSO$_4$ | NYPT | U | SP |
| E-189 | FeSO$_4$ | NYPT | U | DSP |
| E-190 | FeSO$_4$ | NYPT | U | TSP |
| E-191 | FeSO$_4$ | NYPT | U | PR |
| E-192 | FeSO$_4$ | NYPT | U | APP |
| E-193 | ZnCl$_2$ | NBPT | U | MAP |
| E-194 | ZnCl$_2$ | NBPT | U | DAP |
| E-195 | ZnCl$_2$ | NBPT | U | CP |
| E-196 | ZnCl$_2$ | NBPT | U | SP |
| E-197 | ZnCl$_2$ | NBPT | U | DSP |
| E-198 | ZnCl$_2$ | NBPT | U | TSP |
| E-199 | ZnCl$_2$ | NBPT | U | PR |
| E-200 | ZnCl$_2$ | NBPT | U | APP |
| E-201 | ZnCl$_2$ | NBPT | U | MAP |
| E-202 | ZnCl$_2$ | NBPT | U | DAP |
| E-203 | ZnCl$_2$ | NBPT | U | CP |
| E-204 | ZnCl$_2$ | NBPT | U | SP |
| E-205 | ZnCl$_2$ | NBPT | U | DSP |
| E-206 | ZnCl$_2$ | NBPT | U | TSP |
| E-207 | ZnCl$_2$ | NBPT | U | PR |
| E-208 | ZnCl$_2$ | NBPT | U | APP |
| E-209 | ZnSO$_4$ | NBPT | U | MAP |
| E-210 | ZnSO$_4$ | NBPT | U | DAP |
| E-211 | ZnSO$_4$ | NBPT | U | CP |
| E-212 | ZnSO$_4$ | NBPT | U | SP |
| E-213 | ZnSO$_4$ | NBPT | U | DSP |
| E-214 | ZnSO$_4$ | NBPT | U | TSP |
| E-215 | ZnSO$_4$ | NBPT | U | PR |
| E-216 | ZnSO$_4$ | NBPT | U | APP |
| E-217 | ZnSO$_4$ | NBPT | U | MAP |
| E-218 | ZnSO$_4$ | NBPT | U | DAP |
| E-219 | ZnSO$_4$ | NBPT | U | CP |
| E-220 | ZnSO$_4$ | NBPT | U | SP |
| E-221 | ZnSO$_4$ | NBPT | U | DSP |
| E-222 | ZnSO$_4$ | NBPT | U | TSP |
| E-223 | ZnSO$_4$ | NBPT | U | PR |
| E-224 | ZnSO$_4$ | NBPT | U | APP |
| E-225 | ZnCl$_2$ | NPPT | U | MAP |
| E-226 | ZnCl$_2$ | NPPT | U | DAP |
| E-227 | ZnCl$_2$ | NPPT | U | CP |
| E-228 | ZnCl$_2$ | NPPT | U | SP |
| E-229 | ZnCl$_2$ | NPPT | U | DSP |
| E-230 | ZnCl$_2$ | NPPT | U | TSP |
| E-231 | ZnCl$_2$ | NPPT | U | PR |

TABLE E-continued

| (1) + (2) + (3a)/(3b) | (1) | (2) | (3a) | (3b) |
|---|---|---|---|---|
| E-232 | ZnCl₂ | NPPT | U | APP |
| E-233 | ZnCl₂ | NPPT | U | MAP |
| E-234 | ZnCl₂ | NPPT | U | DAP |
| E-235 | ZnCl₂ | NPPT | U | CP |
| E-236 | ZnCl₂ | NPPT | U | SP |
| E-237 | ZnCl₂ | NPPT | U | DSP |
| E-238 | ZnCl₂ | NPPT | U | TSP |
| E-239 | ZnCl₂ | NPPT | U | PR |
| E-240 | ZnCl₂ | NPPT | U | APP |
| E-241 | ZnSO₄ | NPPT | U | MAP |
| E-242 | ZnSO₄ | NPPT | U | DAP |
| E-243 | ZnSO₄ | NPPT | U | CP |
| E-244 | ZnSO₄ | NPPT | U | SP |
| E-245 | ZnSO₄ | NPPT | U | DSP |
| E-246 | ZnSO₄ | NPPT | U | TSP |
| E-247 | ZnSO₄ | NPPT | U | PR |
| E-248 | ZnSO₄ | NPPT | U | APP |
| E-249 | ZnSO₄ | NPPT | U | MAP |
| E-250 | ZnSO₄ | NPPT | U | DAP |
| E-251 | ZnSO₄ | NPPT | U | CP |
| E-252 | ZnSO₄ | NPPT | U | SP |
| E-253 | ZnSO₄ | NPPT | U | DSP |
| E-254 | ZnSO₄ | NPPT | U | TSP |
| E-255 | ZnSO₄ | NPPT | U | PR |
| E-256 | ZnSO₄ | NPPT | U | APP |
| E-257 | ZnCl₂ | NYPT | U | MAP |
| E-258 | ZnCl₂ | NYPT | U | DAP |
| E-259 | ZnCl₂ | NYPT | U | CP |
| E-260 | ZnCl₂ | NYPT | U | SP |
| E-261 | ZnCl₂ | NYPT | U | DSP |
| E-262 | ZnCl₂ | NYPT | U | TSP |
| E-263 | ZnCl₂ | NYPT | U | PR |
| E-264 | ZnCl₂ | NYPT | U | APP |
| E-265 | ZnCl₂ | NYPT | U | MAP |
| E-266 | ZnCl₂ | NYPT | U | DAP |
| E-267 | ZnCl₂ | NYPT | U | CP |
| E-268 | ZnCl₂ | NYPT | U | SP |
| E-269 | ZnCl₂ | NYPT | U | DSP |
| E-270 | ZnCl₂ | NYPT | U | TSP |
| E-271 | ZnCl₂ | NYPT | U | PR |
| E-272 | ZnCl₂ | NYPT | U | APP |
| E-273 | ZnSO₄ | NYPT | U | MAP |
| E-274 | ZnSO₄ | NYPT | U | DAP |
| E-275 | ZnSO₄ | NYPT | U | CP |
| E-276 | ZnSO₄ | NYPT | U | SP |
| E-277 | ZnSO₄ | NYPT | U | DSP |
| E-278 | ZnSO₄ | NYPT | U | TSP |
| E-279 | ZnSO₄ | NYPT | U | PR |
| E-280 | ZnSO₄ | NYPT | U | APP |
| E-281 | ZnSO₄ | NYPT | U | MAP |
| E-282 | ZnSO₄ | NYPT | U | DAP |
| E-283 | ZnSO₄ | NYPT | U | CP |
| E-284 | ZnSO₄ | NYPT | U | SP |
| E-285 | ZnSO₄ | NYPT | U | DSP |
| E-286 | ZnSO₄ | NYPT | U | TSP |
| E-287 | ZnSO₄ | NYPT | U | PR |
| E-288 | ZnSO₄ | NYPT | U | APP |
| E-289 | CuSO₄ | NBPT | U | MAP |
| E-290 | CuSO₄ | NBPT | U | DAP |
| E-291 | CuSO₄ | NBPT | U | CP |
| E-292 | CuSO₄ | NBPT | U | SP |
| E-293 | CuSO₄ | NBPT | U | DSP |
| E-294 | CuSO₄ | NBPT | U | TSP |
| E-295 | CuSO₄ | NBPT | U | PR |
| E-296 | CuSO₄ | NBPT | U | APP |
| E-297 | CuSO₄ | NBPT | U | MAP |
| E-298 | CuSO₄ | NBPT | U | DAP |
| E-299 | CuSO₄ | NBPT | U | CP |
| E-300 | CuSO₄ | NBPT | U | SP |
| E-301 | CuSO₄ | NBPT | U | DSP |
| E-302 | CuSO₄ | NBPT | U | TSP |
| E-303 | CuSO₄ | NBPT | U | PR |
| E-304 | CuSO₄ | NBPT | U | APP |
| E-305 | Ca(NO₃)₂ | NBPT | U | MAP |
| E-306 | Ca(NO₃)₂ | NBPT | U | DAP |
| E-307 | Ca(NO₃)₂ | NBPT | U | CP |
| E-308 | Ca(NO₃)₂ | NBPT | U | SP |
| E-309 | Ca(NO₃)₂ | NBPT | U | DSP |
| E-310 | Ca(NO₃)₂ | NBPT | U | TSP |
| E-311 | Ca(NO₃)₂ | NBPT | U | PR |
| E-312 | Ca(NO₃)₂ | NBPT | U | APP |
| E-313 | Ca(NO₃)₂ | NBPT | U | MAP |
| E-314 | Ca(NO₃)₂ | NBPT | U | DAP |
| E-315 | Ca(NO₃)₂ | NBPT | U | CP |
| E-316 | Ca(NO₃)₂ | NBPT | U | SP |
| E-317 | Ca(NO₃)₂ | NBPT | U | DSP |
| E-318 | Ca(NO₃)₂ | NBPT | U | TSP |
| E-319 | Ca(NO₃)₂ | NBPT | U | PR |
| E-320 | Ca(NO₃)₂ | NBPT | U | APP |
| E-321 | CuSO₄ | NPPT | U | MAP |
| E-322 | CuSO₄ | NPPT | U | DAP |
| E-323 | CuSO₄ | NPPT | U | CP |
| E-324 | CuSO₄ | NPPT | U | SP |
| E-325 | CuSO₄ | NPPT | U | DSP |
| E-326 | CuSO₄ | NPPT | U | TSP |
| E-327 | CuSO₄ | NPPT | U | PR |
| E-328 | CuSO₄ | NPPT | U | APP |
| E-329 | CuSO₄ | NPPT | U | MAP |
| E-330 | CuSO₄ | NPPT | U | DAP |
| E-331 | CuSO₄ | NPPT | U | CP |
| E-332 | CuSO₄ | NPPT | U | SP |
| E-333 | CuSO₄ | NPPT | U | DSP |
| E-334 | CuSO₄ | NPPT | U | TSP |
| E-335 | CuSO₄ | NPPT | U | PR |
| E-336 | CuSO₄ | NPPT | U | APP |
| E-337 | Ca(NO₃)₂ | NPPT | U | MAP |
| E-338 | Ca(NO₃)₂ | NPPT | U | DAP |
| E-339 | Ca(NO₃)₂ | NPPT | U | CP |
| E-340 | Ca(NO₃)₂ | NPPT | U | SP |
| E-341 | Ca(NO₃)₂ | NPPT | U | DSP |
| E-342 | Ca(NO₃)₂ | NPPT | U | TSP |
| E-343 | Ca(NO₃)₂ | NPPT | U | PR |
| E-344 | Ca(NO₃)₂ | NPPT | U | APP |
| E-345 | Ca(NO₃)₂ | NPPT | U | MAP |
| E-346 | Ca(NO₃)₂ | NPPT | U | DAP |
| E-347 | Ca(NO₃)₂ | NPPT | U | CP |
| E-348 | Ca(NO₃)₂ | NPPT | U | SP |
| E-349 | Ca(NO₃)₂ | NPPT | U | DSP |
| E-350 | Ca(NO₃)₂ | NPPT | U | TSP |
| E-351 | Ca(NO₃)₂ | NPPT | U | PR |
| E-352 | Ca(NO₃)₂ | NPPT | U | APP |
| E-353 | CuSO₄ | NYPT | U | MAP |
| E-354 | CuSO₄ | NYPT | U | DAP |
| E-355 | CuSO₄ | NYPT | U | CP |
| E-356 | CuSO₄ | NYPT | U | SP |
| E-357 | CuSO₄ | NYPT | U | DSP |
| E-358 | CuSO₄ | NYPT | U | TSP |
| E-359 | CuSO₄ | NYPT | U | PR |
| E-360 | CuSO₄ | NYPT | U | APP |
| E-361 | CuSO₄ | NYPT | U | MAP |
| E-362 | CuSO₄ | NYPT | U | DAP |
| E-363 | CuSO₄ | NYPT | U | CP |
| E-364 | CuSO₄ | NYPT | U | SP |
| E-365 | CuSO₄ | NYPT | U | DSP |
| E-366 | CuSO₄ | NYPT | U | TSP |
| E-367 | CuSO₄ | NYPT | U | PR |
| E-368 | CuSO₄ | NYPT | U | APP |
| E-369 | Ca(NO₃)₂ | NYPT | U | MAP |
| E-370 | Ca(NO₃)₂ | NYPT | U | DAP |
| E-371 | Ca(NO₃)₂ | NYPT | U | CP |
| E-372 | Ca(NO₃)₂ | NYPT | U | SP |
| E-373 | Ca(NO₃)₂ | NYPT | U | DSP |
| E-374 | Ca(NO₃)₂ | NYPT | U | TSP |
| E-375 | Ca(NO₃)₂ | NYPT | U | PR |
| E-376 | Ca(NO₃)₂ | NYPT | U | APP |
| E-377 | Ca(NO₃)₂ | NYPT | U | MAP |
| E-378 | Ca(NO₃)₂ | NYPT | U | DAP |
| E-379 | Ca(NO₃)₂ | NYPT | U | CP |
| E-380 | Ca(NO₃)₂ | NYPT | U | SP |
| E-381 | Ca(NO₃)₂ | NYPT | U | DSP |
| E-382 | Ca(NO₃)₂ | NYPT | U | TSP |
| E-383 | Ca(NO₃)₂ | NYPT | U | PR |
| E-384 | Ca(NO₃)₂ | NYPT | U | APP |

The abbreviations are the same as used in Tables B and C.

It is to be understood that in each case of the preferred embodiments listed in the above Tables A and E, the (thio)phosphoric acid triamide (2), i.e. NBPT, NPPT or NBPT+NPPT, may preferably be provided in combination with an amine (4) as defined above.

In connection with the use (and the composition A defined in this connection), the method (and the composition A defined in this connection), the mixture M, the granule G, and the composition B as defined herein, it is preferred that the cation source (1) is provided in certain minimum amount based on the fertilizer mixture (3) or the P-containing fertilizer (3b) in order to exhibit the stabilizing effect.

In a preferred embodiment, the cation source (1) is used in an amount of at least 0.25 wt.-% based on the total weight of the fertilizer mixture (3), or in an amount of at least 0.5 wt.-% based on the total weight of the P-containing fertilizer (3b).

In a more preferred embodiment, the cation source (1) is used in an amount of at least 0.375 wt.-% based on the total weight of the fertilizer mixture (3), or in an amount of at least 0.75 wt.-% based on the total weight of the P-containing fertilizer (3b).

In an even more preferred embodiment, the cation source (1) is used in an amount of at least 0.5 wt.-% based on the total weight of the fertilizer mixture (3), or in an amount of at least 1 wt.-% based on the total weight of the P-containing fertilizer (3b).

In a most preferred embodiment, the cation source (1) is used in an amount of at least 1 wt.-% based on the total weight of the fertilizer mixture (3), or in an amount of at least 2 wt.-% based on the total weight of the P-containing fertilizer (3b).

In another preferred embodiment, the cation source (1) is used in an amount of at most 20 wt.-% based on the total weight of the fertilizer mixture (3), or in an amount of at most 40 wt.-% based on the total weight of the P-containing fertilizer (3b)

In a more preferred embodiment, the cation source (1) is used in an amount of at most 10 wt.-% based on the total weight of the fertilizer mixture (3), or in an amount of at most 20 wt.-% based on the total weight of the P-containing fertilizer (3b).

In a most preferred embodiment, the cation source (1) is used in an amount of at most 5 wt.-% based on the total weight of the fertilizer mixture (3), or in an amount of at least 10 wt.-% based on the total weight of the P-containing fertilizer (3b).

In a particularly preferred embodiment, the cation source (1) is used in an amount of at most 2.5 wt.-% based on the total weight of the fertilizer mixture (3), or in an amount of at least 5 wt.-% based on the total weight of the P-containing fertilizer (3b).

Preferably, the cation source (1) is used in such an amount that it does not exhibit any urease inhibiting effect by itself.

These amounts especially apply to the situation, where the cation source (1) is a salt as defined above.

A skilled person further knows suitable amounts of the (thio)phosphoric acid triamide (2) and optionally the amine (4) based on the fertilizer (3a).

In a preferred embodiment, the (thio)phosphoric acid triamide (2) is used in an amount of at least 0.005 wt.-% based on the total weight of the fertilizer (3a).

In a more preferred embodiment, the (thio)phosphoric acid triamide (2) is used in an amount of at least 0.01 wt.-% based on the total weight of the fertilizer (3a).

In an even more preferred embodiment, the (thio)phosphoric acid triamide (2) is used in an amount of at least 0.05 wt.-% based on the total weight of the fertilizer (3a).

In another preferred embodiment, the (thio)phosphoric acid triamide (2) is used in an amount of at most 20 wt.-% based on the total weight of the fertilizer (3a).

In another preferred embodiment, the (thio)phosphoric acid triamide (2) is used in an amount of at most 10 wt.-% based on the total weight of the fertilizer (3a).

These amounts apply especially to the situation, where the (thio)phosphoric acid triamide (2) is NBPT or NPPT or the combination of NBPT and NPPT. In connection with the combination of NBPT and NPPT, it is to be understood that the above amounts refer to the combination and not to the individual compounds.

In another preferred embodiment, the amine (4) is used in an amount of at least 0.005 wt.-% based on the total weight of the fertilizer (3a).

In a more preferred embodiment, the amine (4) is used in an amount of at least 0.01 wt.-% based on the total weight of the fertilizer (3a).

In an even more preferred embodiment, the amine (4) is used in an amount of at least 0.05 wt.-% based on the total weight of the fertilizer (3a).

In another preferred embodiment, the amine (4) is used in an amount of at most 20 wt.-% based on the total weight of the fertilizer (3a).

In another preferred embodiment, the amine (4) is used in an amount of at most 10 wt.-% based on the total weight of the fertilizer (3a).

It is to be understood that the compositions A and B, the mixture M, and the granule G may further comprise auxiliaries such as solvents, solid carriers, surfactants, adjuvants, thickeners, bactericides, anti-freezing agents, anti-foaming agents, colorants, tackifiers, binders, preservatives, antioxidants, and odorants.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, cyclohexanol; glycols; DMSO; ketones, e.g. cyclohexanone; esters, e.g. lactates, carbonates, fatty acid esters, gammabutyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkyl phenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable non ionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, aryl phenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or poly-ethyleneamines.

Suitable adjuvants are compounds, which have a neglectable or even no pesticidal activity themselves. Examples are surfactants, mineral or vegetable oils, and other auxiliaries. Further examples are listed by Knowles, Adjuvants and additives, Agrow Reports OS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are
inorganic colorants, such as iron oxide, titan oxide, iron hexacyanoferrate,
metal-complex dyes such as chromium-complex dyes, for example Orasol Yellow 141,
organic colorants such as alizarin-, azo- and phthalocyanine colorants.

Preferred colorants are metal-complex dyes, more preferably chromium-complex dyes, for example Orasol Yellow 141.

Suitable tackifiers or binders are polyvinylpyrrolidones, polyvinylacetates, polyvinyl alcohols, polyacrylates, biological or synthetic waxes, and cellulose ethers.

Suitable preservatives include e.g. sodium benzoate, benzoic acid, sorbic acid, and derivatives thereof.

Suitable antioxidants include sulfites, ascorbic acid, tocopherol, tocopherol acetate, tocotrienol, melatonin, carotene, beta-carotene, ubiquinol, and derivatives thereof. Tocphercol acetate is preferred as antioxidant.

Suitable odorants include perfume materials which are for example mentioned in U.S. Pat. No. 7,182,537, including allo-ocimene, Allyl cyclohexanepropionate, Allyl heptanoate, trans-Anethole, benzylbutyrate, Camphene, Cadinene, Carvacrol, cis-3-Hexenyl tiglate, Citronellol, Citronellyl acetate, Citronellyl nitrile, Citronellyl propionate, Cyclohexylethyl acetate, Decyl Aldehyde (Capraldehyde), Dihydromyrcenol, Dihydromyrcenyl acetate, 3,7-Dimethyl-1-octanol, Diphenyloxide, Fenchyl Acetate (1,3,3-Trimethyl-2-norbornanyl acetate), Geranyl acetate, Geranyl formate, Geranyl nitrile, cis-3-Hexenyl isobutyrate, Hexyl Neopentanoate, Hexyl tiglate, alpha-Ionone, Ethyl Vanillin L80, Isoeugenol, Methyl cinnamate, Methyl dihydrojasmonate, Methyl beta-naphthyl ketone, Phenoxy ethyl isobutyrate, Vanillin L28, Isobornyl acetate, Isobutyl benzoate, Isononyl acetate, Isononyl alcohol (3,5,5-Trimethyl-1-hexanol), Isopulegyl acetate, Lauraldehyde, d-Limonene, Linalyl acetate, (−)-L-Menthyl acetate, Methyl Chavicol (Estragole), Methyl n-nonyl acetaldehyde, methyl octyl acetaldehyde, beta-Myrcene, Neryl acetate, Nonyl acetate, Nonaldehyde, p-Cymene, alpha-Pinene, beta-Pinene, alpha-Terpinene, gamma-Terpinene, alpha-Terpinyl acetate, Tetrahydrolinalool, Tetrahydromyrcenol, 2-Undecenal, Verdox (o-t-Butylcyclohexyl acetate), Vertenex (4-tert,Butylcyclohexyl acetate). Citronellyl nitrile is preferred as odorant.

The present invention is further illustrated by the following examples.

EXAMPLES

Materials:
Urease Inhibitors:
  Urease inhibitor "U1" was obtained from BASF SE.
Composition:
  18.75 wt.-% N-butylphosphorothioic triamide (NBPT, CAS-no.: 94317-64-3)
  6.25 wt.-% N-propylphosphorothioic triamide (NPPT, CAS-no.: 916809-14-8)
  15-25 wt.-% stabilizer
  30-40 wt.-% benzyl alcohol (CAS-no.: 100-51-6)
  10-20 wt.-% Agnique AMD 3 L (CAS-no.: 35123-06-9)
  0.5-2 wt.-% colorant
  0.5-2 wt.-% odorant
Fertilizers:
  Urea (Piagran 46) was obtained from SKW Piesteritz.
  Any one of the following fertilizers was used as additional P-containing fertilizer: Diammonium phosphate (DAP)
  Triple super phosphate (TSP)
  16-8-22 fertilizer Cation Source:

Any one of the following salts was used as cation source:
Magnesium sulfate anhydrous ($MgSO_4$)
Magnesium sulfate heptahydrate ($MgSO_4 \times 7H_2O$)
Calcium chloride anhydrous ($CaCl_2$)
Calcium sulfate dihydrate ($CaSO_4 \times 2H_2O$)
Calcium nitrate ($Ca(NO_3)_2$)
Copper sulfate ($CuSO_4$)
Iron sulfate ($FeSO_4$)
Zinc sulfate ($ZnSO_4$)
Zinc chloride ($ZnCl_2$)
Aluminium sulfate ($Al_2(SO_4)_3$)

General Experimental Details:

For the preparation of urea treated with U1, 3 kg of urea fertilizer granules were added to an ERWEKA mixer (dimensions mix drum: 50 cm diameter, 20 cm high). The mixer is turned on (27 RPM) and U1 formulation is sprayed on the urea using a syringe. Afterwards, the fertilizer/U1 mixture is mixed for 3 minutes For the Dräger test, 150 g Limburgerhof (Germany) soil is added to a 500 mL wide-mouth jar (9 cm diameter). Fertilizer granules are added and distributed evenly over the soil. The amount of fertilizer added corresponds to 115 mg of urea-N. The soil and fertilizer are then wetted with a fine spray of water (1 mL). Afterwards, the jar is closed with a lid. In the middle of the lid a hole is made in which an ammonia gas test tube (Dräger, Ammoniak 20/a-D 8101301, Diffusionsröhrchen) is placed. The urease, naturally present in the soil, hydrolyses urea into carbon dioxide and ammonia. The concentration of ammonia gas is read out once a day from the scale on the Dräger diffusion tube. All tests are performed in duplicate.

Active ingredient content on urea was analyzed by HPLC (high-pressure liquid chromatography) using method DIN EN 16651. In case of bulk blends, the urea granules were separated from the other fertilizers before dissolving in water for HPLC analysis.

For the preparation of dry blend fertilizer mixtures, 10 g of urea treated with a urease inhibitor and 10 g of the other fertilizer are added to a small jar. After closing the jar, the fertilizers are mixed by vigorously shaking the jar. The closed jar is then stored at room temperature in a dark place. At the end of the storage time, urea granules are removed and tested using the Dräger test.

Example 1 (Comparative Example)

Urea granules treated with 0.04 wt.-% U1 active ingredient were mixed with TSP (Triple Super Phosphate) fertilizer granules. After mixing, the samples were stored in closed containers at room temperature. After 1 day of storage, the urea granules were separated from the TSP granules and the active ingredient (a.i.) concentration on the urea was analyzed by HPLC. Table 1 shows that when U1 treated urea granules are mixed with TSP granules, 50-90% of the a.i. degrades within a day, depending on the amount of TSP in the mixture.

TABLE 1

A.i. analysis after separating urea from TSP mixtures

|  | U1 a.i. (wt.-%) | Remaining a.i. (%) |
|---|---|---|
| Urea | 0.037 | 100 |
| Urea/TSP 2:1 | 0.017 | 45.9 |
| Urea/TSP 1:1 | 0.005 | 13.5 |
| Urea/TSP 1:2 | 0.003 | 8.1 |

Example 2 (Comparative Example)

Urea treated with U1 (0.04 wt.-% active on urea) was mixed with different phosphate fertilizers in a 1:1 wt.-% ratio. These mixtures were stored in closed containers at room temperature for 8 days. Afterwards, the urea granules were separated out and tested in the Dräger test. The following samples were tested:

Sample 1: Urea

Sample 2: Urea treated with 0.04 wt.-% U1 active ingredient

Sample 3: Urea treated with 0.04 wt.-% U1 active ingredient, then mixed with TSP in a 50:50 wt.-% ratio Sample 4: Urea treated with 0.04 wt.-% U1 active ingredient, then mixed with DAP in a 50:50 wt.-% ratio Each experiment was performed twice (samples a and b). As can be seen in Table 2a, a concentration of 600 ppm $NH_3$ is reached with untreated urea after 2 days. Treatment with 0.04 wt.-% U1 active ingredient effectively inhibits the urease activity and only after 9 days a $NH_3$ concentration of 600 ppm is reached. For the urea granules treated with U1, which were mixed with phosphate fertilizers, a clear reduction in the efficacy of U1 is observed. With TSP the 600 ppm $NH_3$ concentration is reached after 3 days and with DAP after 4 days. Repeating the Dräger test after storing the mixtures for 36 days (Table 2b), shows no urease inhibition for the TSP and DAP samples (>1500 ppm $NH_3$ after 3 days) anymore.

TABLE 2a

Emission after a 9 day storage period

| Time | Ammonia emission (ppm) | | | | | | | |
|---|---|---|---|---|---|---|---|---|
| | Sample 1 | | Sample 2 | | Sample 3 | | Sample 4 | |
| (days) | a | b | a | b | a | b | a | b |
| 0 | 0 | 0 | 0 | 0 | 0 | 0 | 0 | 0 |
| 1 | 20 | 0 | 0 | 0 | 0 | 0 | 0 | 0 |
| 2 | 650 | 500 | 20 | 0 | 150 | 100 | 75 | 50 |
| 3 | >1500 | >1500 | 20 | 20 | 600 | 600 | 250 | 250 |
| 4 | | | 50 | 50 | 1500 | 1500 | 600 | 600 |
| 5 | | | 100 | 100 | >1500 | >1500 | 1200 | 1200 |
| 6 | | | 200 | 200 | | | >1500 | >1500 |

TABLE 2a-continued

Emission after a 9 day storage period

| Time | Sample 1 | | Sample 2 | | Sample 3 | | Sample 4 | |
|---|---|---|---|---|---|---|---|---|
| (days) | a | b | a | b | a | b | a | b |
| 7 | | | 300 | 300 | | | | |
| 10 | | | 900 | 800 | | | | |

TABLE 2b

Emission after a 36 day storage period

Ammonia emission (ppm)

| Time | Sample 1 | | Sample 2 | | Sample 3 | | Sample 4 | |
|---|---|---|---|---|---|---|---|---|
| (days) | a | b | a | b | a | b | a | b |
| 0 | 0 | 0 | 0 | 0 | 0 | 0 | 0 | 0 |
| 3 | >1500 | >1500 | 50 | 50 | >1500 | >1500 | >1500 | >1500 |
| 4 | | | 75 | 75 | | | | |
| 5 | | | 150 | 125 | | | | |
| 6 | | | 250 | 250 | | | | |
| 7 | | | 300 | 400 | | | | |
| 8 | | | 450 | 500 | | | | |
| 9 | | | 700 | 800 | | | | |
| 10 | | | 800 | 950 | | | | |

Example 3

10 g U1 treated urea and 0.5 g magnesium sulfate were added to a jar and mixed by shaking the jar. Afterwards, 10 gram phosphate fertilizer was added and mixed by shaking the jar.

Sample 1: urea treated with 0.04 wt.-% U1 active ingredient (Comparative Sample)
Sample 2: 10 g urea treated with 0.04 wt.-% U1 active ingredient, 0.5 g $MgSO_4$, 10 g TSP
Sample 3: 10 g urea treated with 0.04 wt.-% U1 active ingredient, 0.5 g $MgSO_4$, 10 g DAP The closed jar was then stored at room temperature in a dark place. After 0.5, 2, 4 and 6 months urea granules were removed from the jar and tested with the Dräger test. As can be seen in tables 3a and 3b, 2.5 wt.-% magnesium sulfate can prevent degradation of U1 in mixtures containing phosphate fertilizers for up to 6 months.

TABLE 3a

Emission after 0.5 months of storage

Ammonia emissions (ppm)

| Time | Sample 1 | | Sample 2 | | Sample 3 |
|---|---|---|---|---|---|
| (days) | a | b | a | b | |
| 0 | 0 | 0 | 0 | 0 | 0 0 |
| 1 | 0 | 0 | 0 | 0 | 0 0 |
| 2 | 20 | 0 | 20 | 50 | 0 0 |
| 3 | 20 | 20 | 100 | 150 | 20 20 |
| 4 | 50 | 50 | 300 | 300 | 50 50 |
| 5 | 100 | 100 | 550 | 600 | 100 100 |
| 6 | 200 | 200 | 1000 | 1000 | 200 200 |
| 7 | 300 | 300 | 1500 | 1400 | 300 400 |
| 10 | 900 | 800 | >1500 | >1500 | 800 1100 |

TABLE 3b

Emission after 2, 4, or 6 months of storage

Ammonia emission (ppm)

| | 2 months storage of NP mixture | | | | 4 months storage of NP mixture | | | | 6 months storage of NP mixture | | | |
|---|---|---|---|---|---|---|---|---|---|---|---|---|
| Time | Sample 1 | | Sample 3 | | Sample 1 | | Sample 3 | | Sample 1 | | Sample 3 | |
| (days) | a | b | a | b | a | b | a | b | a | b | a | b |
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 2 | 0 | 0 | 0 | 0 | 10 | 10 | 20 | 20 | 0 | 0 | 0 | 0 |
| 3 | 20 | 20 | 20 | 20 | 20 | 20 | 20 | 20 | 0 | 0 | 5 | 5 |
| 4 | 22 | 22 | 40 | 30 | na | na | na | na | 5 | 5 | 20 | 20 |
| 5 | 35 | 35 | 60 | 50 | 40 | 30 | 50 | 50 | 10 | 10 | 40 | 40 |
| 6 | 50 | 50 | 100 | 100 | 50 | 50 | 75 | 100 | 30 | 30 | 50 | 60 |
| 7 | 100 | 100 | 250 | 200 | 100 | 100 | 175 | 200 | 50 | 50 | 75 | 100 |
| 8 | 190 | 190 | 350 | 280 | 150 | 125 | 250 | 250 | 60 | 60 | 110 | 140 |

TABLE 3b-continued

Emission after 2, 4, or 6 months of storage

Ammonia emission (ppm)

| | 2 months storage of NP mixture | | | | 4 months storage of NP mixture | | | | 6 months storage of NP mixture | | | |
|---|---|---|---|---|---|---|---|---|---|---|---|---|
| | Sample 1 | | Sample 3 | | Sample 1 | | Sample 3 | | Sample 1 | | Sample 3 | |
| Time (days) | a | b | a | b | a | b | a | b | a | b | a | b |
| 9 | 250 | 250 | 500 | 300 | 200 | 200 | 300 | 350 | 80 | 80 | 200 | 200 |
| 10 | 275 | 275 | 550 | 350 | 225 | 275 | 400 | 475 | 100 | 100 | 250 | 250 |
| 11 | | | | | 300 | 325 | 500 | 600 | 180 | 180 | 320 | 320 |
| 12 | | | | | 450 | 400 | 700 | 800 | 280 | 280 | 450 | 400 |
| 13 | | | | | | | | | 320 | 300 | 600 | 500 | na: data not available

Example 4

10 g U1 treated urea and 0.25 gram magnesium sulfate were added to a jar and mixed by shaking the jar. Afterwards, 10 g phosphate fertilizer was added and mixed by shaking the jar.

Sample 1: 10 g urea, 0.25 g MgSO4
Sample 2: 10 g urea treated with 0.04 wt.-% U1 active ingredient, 10 g DAP
Sample 3: 10 g urea treated with 0.04 wt.-% U1 active ingredient, 0.25 g MgSO4, 10 g DAP The closed jar was then stored at room temperature in a dark place. After 1 month the urea granules were removed from the jar and tested with the Dräger test. As can be seen in Table 4, magnesium sulfate by itself does not inhibit the urease activity, but does prevent the degradation of U1 in fertilizer mixtures containing DAP.

TABLE 4

| Time | ammonia emission (ppm) | | | | | |
|---|---|---|---|---|---|---|
| (days) | 1a | 1b | 2a | 2b | 3a | 3b |
| 0 | 0 | 0 | 0 | 0 | 0 | 0 |
| 1 | 0 | 0 | 0 | 20 | 0 | 0 |
| 2 | 800 | 775 | 825 | 750 | 0 | 0 |
| 3 | >1500 | >1500 | >1500 | >1500 | 20 | 20 |
| 4 | | | | | 30 | 50 |
| 5 | | | | | 50 | 60 |
| 6 | | | | | 100 | 100 |
| 7 | | | | | 200 | 200 |
| 8 | | | | | 300 | 300 |
| 9 | | | | | 350 | 350 |
| 10 | | | | | 450 | 475 |

Example 5

10 gram U1 treated urea and 0.5 gram salt were added to a jar and mixed by shaking the jar. Afterwards, 10 gram DAP was added and mixed in by shaking the jar.

Sample 1: urea
Sample 2: urea treated with 0.04 wt.-% U1 active ingredient
Sample 8: 10 g urea treated with 0.04 wt.-% U1 active ingredient, 0.25 g anhydrous magnesium sulfate
Sample 9: 10 g urea treated with 0.04 wt.-% U1 active ingredient, 0.25 g anhydrous magnesium sulfate, 10 g DAP
Sample 10: 10 g urea treated with 0.04 wt.-% U1 active ingredient, 0.25 magnesium sulfate heptahydrate, 10 g DAP
Sample 11: 10 g urea treated with 0.04 wt.-% U1 active ingredient 0.25 g calcium sulfate dehydrate, 10 g DAP
Sample 12: 10 g urea treated with 0.04 wt.-% U1 active ingredient 0.25 g anhydrous calcium chloride, 10 g DAP The closed jar was then stored at room temperature in a dark place. After 18 days, the urea granules were removed from the jar and tested with the Dräger test. As shown in Table 5, magnesium sulfate on its own does not inhibit the urease enzyme. Magnesium sulfate heptahydrate does prevent the degradation of U1 as effectively as anhydrous magnesium sulfate, showing that the desiccant properties of magnesium sulfate do not play a role in the prevention of U1 degradation. Also other cation providing salts, like calcium sulfate and calcium chloride are effective in preventing the degradation of U1.

TABLE 5

(part 1)

| | Ammonia emission (ppm) | | | | | |
|---|---|---|---|---|---|---|
| Time | 1 | | 2 | | 8 | |
| (days) | a | b | a | b | a | b |
| 0 | 0 | 0 | 0 | 0 | 0 | 0 |
| 3 | >1500 | >1500 | 20 | 20 | >1500 | >1500 |
| 4 | | | 25 | 25 | | |
| 5 | | | 50 | 50 | | |
| 6 | | | 75 | 75 | | |
| 7 | | | 125 | 125 | | |
| 8 | | | 200 | 200 | | |
| 9 | | | 300 | 300 | | |
| 10 | | | 400 | 350 | | |

(part 2)

| | Ammonia emission (ppm) | | | | | | | |
|---|---|---|---|---|---|---|---|---|
| Time | 9 | | 10 | | 11 | | 12 | |
| (days) | a | b | a | b | a | b | a | b |
| 0 | 0 | 0 | 0 | 0 | 0 | 0 | 0 | 0 |
| 3 | 25 | 20 | 20 | 20 | 25 | 25 | 20 | 15 |
| 4 | 50 | 30 | 45 | 35 | 50 | 60 | 25 | 20 |
| 5 | 100 | 50 | 60 | 60 | 150 | 150 | 50 | 50 |
| 6 | 150 | 100 | 100 | 125 | 300 | 300 | 100 | 75 |
| 7 | 300 | 300 | 200 | 275 | 500 | 500 | 200 | 125 |
| 8 | 450 | 300 | 300 | 475 | 800 | 800 | 300 | 275 |
| 9 | 525 | 350 | 475 | 525 | 1100 | 1100 | 450 | 325 |
| 10 | 700 | 475 | 525 | 800 | 1400 | 1300 | 525 | 425 |

Example 6

10 g U1 treated urea and different amounts of magnesium sulfate were added to a jar and mixed by shaking the jar. Afterwards, 10 g DAP was added and mixed by shaking the jar. The closed jar was then stored at room temperature in a dark place. After 5 days, the urea granules were removed from the jar and tested with the Dräger test. The following samples were tested:

Sample 1: 10 g urea treated with 0.04 wt.-% U1 active ingredient, 0.5 g anhydrous magnesium sulfate, 10 g DAP Sample 2: 10 g urea treated with 0.04 wt.-% U1 active ingredient, 0.25 g anhydrous magnesium sulfate, 10 g DAP Sample 3: 10 g urea treated with 0.04 wt.-% U1 active ingredient, 0.18 g anhydrous magnesium sulfate, 10 g DAP Sample 4: 10 g urea treated with 0.04 wt.-% U1 active ingredient, 0.11 g anhydrous magnesium sulfate, 10 g DAP Sample 5: 10 g urea treated with 0.04 wt.-% U1 active ingredient, 0.05 g anhydrous magnesium sulfate, 10 g DAP As can be seen in Table 6, after 5 days storage of the NP mixture as low as 0.25 wt.-% $MgSO_4$ is effective to avoid U1 degradation.

TABLE 6

Emission with various concentrations of $MgSO_4$

| Time (Days) | Ammonia emission (ppm) | | | | | | | | | |
|---|---|---|---|---|---|---|---|---|---|---|
| | 1a | 1b | 2a | 2b | 3a | 3b | 4a | 4b | 5a | 5b |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 10 | 15 | 15 | 10 | 15 | 20 | 15 | 15 | 20 | 20 |
| 3 | 20 | 25 | 30 | 20 | 25 | 30 | 30 | 25 | 30 | 40 |
| 4 | 30 | 50 | 40 | 40 | 50 | 50 | 50 | 50 | 80 | 90 |
| 5 | 50 | 75 | 60 | 60 | 90 | 75 | 90 | 90 | 150 | 150 |
| 6 | 100 | 150 | 125 | 125 | 150 | 125 | 175 | 175 | 250 | 275 |
| 7 | 200 | 250 | 225 | 250 | 225 | 225 | 275 | 275 | 400 | 400 |
| 8 | 300 | 350 | 300 | 350 | 350 | 300 | 400 | 350 | 550 | 550 |
| 9 | 425 | 500 | 425 | 500 | 475 | 425 | 500 | 500 | 800 | 800 |
| 10 | 680 | 780 | 580 | 780 | 650 | 650 | 800 | 780 | 1000 | 1080 |

Example 7

10 g urea treated with 0.04 wt.-% U1 active ingredient and 0.25 g magnesium sulfate were added to a jar and mixed by shaking the jar. Afterwards, 10 g DAP was added and mixed by shaking the jar. The closed jar was then stored at room temperature in a dark place. After 5 months the urea granules were removed from the jar and tested with the Dräger test. As can be seen in Table 7, 1.25 wt.-% magnesium sulfate can prevent degradation of U1 in mixtures containing DAP for up to 5 months.

Sample 1: urea

Sample 2: urea treated with 0.04 wt.-% U1 active ingredient

Sample 3: 10 g urea treated with 0.04 wt.-% U1 active ingredient, 10 g DAP

Sample 4: 10 g urea treated with 0.04 wt.-% U1 active ingredient, 0.25 g anhydrous magnesium sulfate, 10 g DAP

TABLE 7

Emission after storage of 5 months with 1.25 wt.-% $MgSO_4$

| Time (Days) | Ammonia emission (ppm) | | | | | | | |
|---|---|---|---|---|---|---|---|---|
| | 1a | 1b | 2a | 2b | 3a | 3b | 4a | 4b |
| 0 | 0 | 0 | 0 | 0 | 0 | 0 | 0 | 0 |
| 1 | 0 | 0 | 0 | 0 | 0 | 0 | 0 | 0 |
| 2 | 50 | 80 | 0 | 0 | 70 | 30 | 0 | 0 |
| 3 | 1000 | 900 | 0 | 0 | 900 | 800 | 0 | 0 |
| 4 | >1500 | >1500 | 5 | 10 | >1500 | >1500 | 20 | 20 |
| 5 | | | 10 | 20 | | | 30 | 20 |
| 6 | | | 40 | 20 | | | 50 | 50 |
| 7 | | | 50 | 40 | | | 100 | 100 |
| 8 | | | 60 | 50 | | | 120 | 150 |
| 9 | | | 80 | 70 | | | 200 | 200 |
| 10 | | | 150 | 100 | | | 300 | 300 |

TABLE 7-continued

Emission after storage of 5 months with 1.25 wt.-% MgSO$_4$

| Time | Ammonia emission (ppm) | | | | | | | |
|---|---|---|---|---|---|---|---|---|
| (Days) | 1a | 1b | 2a | 2b | 3a | 3b | 4a | 4b |
| 11 | | | 220 | 180 | | | 450 | 400 |
| 12 | | | 300 | 220 | | | 600 | 600 |
| 13 | | | 380 | 400 | | | 780 | 780 |

Example 8

Urea was treated with different NBPT based urease inhibitors (0.04 wt.-% active ingredient on urea).

10 g of the treated urea and 0.5 g magnesium sulfate were added to a jar and mixed by shaking the jar. Afterwards, 10 g DAP was added and mixed by shaking the jar. The closed jar was then stored at room temperature in a dark place. After 3 weeks the urea granules were removed from the jar and tested with the Dräger test. The following samples were tested:

Sample 1: 10 g urea treated with 0.04 wt.-% U1 active ingredient
Sample 2: 10 g urea treated with 0.04 wt.-% U1 active ingredient, 10 g DAP
Sample 3: 10 g urea treated with 0.04 wt.-% U1 active ingredient, 0.5 g anhydrous, magnesium sulfate, 10 g DAP
Sample 4: 10 g urea treated with 0.04 wt.-% U1 active ingredient, 0.5 g anhydrous, calcium chloride, 10 g DAP
Sample 5: 10 g urea treated with 0.04 wt.-% Agrotain Advance active ingredient
Sample 6: 10 g urea treated with 0.04 wt.-% Agrotain Advance active ingredient, 10 g DAP
Sample 7: 10 g urea treated with 0.04 wt.-% Agrotain Advance active ingredient, 0.5 g anhydrous magnesium sulfate, 10 g DAP
Sample 8: 10 g urea treated with 0.04 wt.-% Agrotain Advance active ingredient 0.5 g anhydrous calcium chloride, 10 g DAP
Sample 9: 10 g urea treated with 0.04 wt.-% Agrotain Ultra active ingredient
Sample 10: 10 g urea treated with 0.04 wt.-% Agrotain Ultra active ingredient, 10 g DAP
Sample 11: 10 g urea treated with 0.04 wt.-% Agrotain Ultra active ingredient, 0.5 g anhydrous magnesium sulfate, 10 g DAP
Sample 12: 10 g urea treated with 0.04 wt.-% Agrotain Ultra active ingredient, 0.5 g anhydrous calcium chloride, 10 g DAP As can be seen in Table 8 a, b, and c for all of the tested products active ingredient degradation takes place in the presence of DAP resulting in a significantly reduced efficacy. Addition of MgSO$_4$ or CaCl$_2$ eliminates the influence of DAP on the performance of the tested urease inhibitors in urea/DAP blends.

TABLE 8a

Emission with U1

| Time | Ammonia emission (ppm) | | | | | | | |
|---|---|---|---|---|---|---|---|---|
| (Days) | 1a | 1b | 2a | 2b | 3a | 3b | 4a | 4b |
| 0 | 0 | 0 | 0 | 0 | 0 | 0 | 0 | 0 |
| 1 | 0 | 0 | 10 | 10 | 0 | 0 | 0 | 0 |
| 2 | 10 | 10 | 45 | 30 | 5 | 5 | 5 | 5 |
| 3 | 20 | 20 | 150 | 100 | 20 | 20 | 20 | 20 |
| 4 | 30 | 30 | 400 | 400 | 35 | 35 | 35 | 35 |
| 5 | 50 | 50 | 800 | 800 | 50 | 50 | 50 | 50 |
| 6 | 100 | 90 | 1350 | 1250 | 100 | 100 | 75 | 60 |
| 7 | 200 | 120 | >1500 | >1500 | 120 | 180 | 100 | 100 |
| 8 | 250 | 200 | | | 200 | 250 | 200 | 150 |
| 9 | 300 | 300 | | | 300 | 300 | 300 | 200 |
| 10 | 400 | 400 | | | 300 | 400 | 350 | 300 |
| 11 | 500 | 500 | | | 450 | 500 | 500 | 400 |

TABLE 8b

Emission with Agrotain Advance

| Time | Ammonia emission (ppm) | | | | | | | |
|---|---|---|---|---|---|---|---|---|
| (Days) | 5a | 5b | 6a | 6b | 7a | 7b | 8a | 8b |
| 0 | 0 | 0 | 0 | 0 | 0 | 0 | 0 | 0 |
| 1 | 0 | 0 | 10 | 10 | 0 | 20 | 0 | 0 |
| 2 | 5 | 5 | 50 | 40 | 5 | 25 | 5 | 5 |
| 3 | 20 | 20 | 300 | 200 | 20 | 50 | 20 | 20 |
| 4 | 35 | 35 | 1000 | 800 | 35 | 100 | 35 | 35 |
| 5 | 50 | 50 | >1500 | >1500 | 50 | 100 | 50 | 50 |
| 6 | 60 | 100 | | | 100 | 200 | 75 | 75 |
| 7 | 120 | 180 | | | 180 | 300 | 120 | 120 |
| 8 | 200 | 250 | | | 200 | 350 | 200 | 200 |
| 9 | 300 | 300 | | | 300 | 450 | 300 | 280 |
| 10 | 350 | 400 | | | 400 | 500 | 350 | 350 |
| 11 | 500 | 500 | | | 500 | 700 | 500 | 500 |

TABLE 8c

Emission with Agrotain Ultra

| Time | Ammonia emission (ppm) | | | | | | | |
|---|---|---|---|---|---|---|---|---|
| (Days) | 9a | 9b | 10a | 10b | 11a | 11b | 12a | 12b |
| 0 | 0 | 0 | 0 | 0 | 0 | 0 | 0 | 0 |
| 1 | 0 | 0 | 10 | 10 | 0 | 0 | 0 | 0 |
| 2 | 10 | 10 | 25 | 40 | 10 | 10 | 5 | 10 |
| 3 | 20 | 20 | 300 | 400 | 20 | 20 | 20 | 20 |
| 4 | 35 | 35 | 1300 | 1500 | 35 | 35 | 35 | 35 |
| 5 | 50 | 50 | >1500 | >1500 | 50 | 50 | 50 | 50 |
| 6 | 75 | 60 | | | 100 | 100 | 100 | 100 |
| 7 | 150 | 120 | | | 180 | 180 | 180 | 180 |
| 8 | 200 | 200 | | | 250 | 200 | 250 | 250 |
| 9 | 350 | 300 | | | 350 | 350 | 350 | 350 |
| 10 | 500 | 350 | | | 500 | 500 | 500 | 500 |
| 11 | 650 | 500 | | | 600 | 600 | 600 | 600 |

Example 9

A 16-8-22 wetblend fertilizer was treated with a solution of $CaCl_2$ dissolved in DMSO. For the preparation of the $CaCl_2$ solution, 8 g $CaCl_2$ was dissolved in 100 g DMSO. 50 grams of fertilizer was treated with 8.4 grams of $CaCl_2$ solution. The fertilizer was allowed to dry for 2 days at room temperature. Afterwards the fertilizer was treated with U1 to obtain a U1 active ingredient concentration on the fertilizer of 0.04 wt.-%. After 1 month storage in a closed jar at room temperature in a dark place, the fertilizer was tested with the Dräger test. The following samples were tested:

Sample 1: 16-8-22 fertilizer treated with U1 active ingredient

Sample 2: 16-8-22 fertilizer treated with $CaCl_2$ solution

Sample 3: 16-8-22 fertilizer treated with $CaCl_2$ solution and U1 active ingredient As can be seen in Table 9, $CaCl_2$ is able to prevent the degradation of U1 active ingredient on wetblend fertilizers.

TABLE 9

| Emission of a NPK wetblend fertilizer treated with a $CaCl_2$ solution | | | | | | |
|---|---|---|---|---|---|---|
| Time | Ammonia emission (ppm) | | | | | |
| (Days) | 1a | 1b | 2a | 2b | 3a | 3b |
| 0 | 0 | 0 | 0 | 0 | 0 | 0 |
| 1 | 10 | 20 | 2 | 15 | 0 | 0 |
| 2 | 35 | 50 | 20 | 30 | 20 | 20 |
| 3 | 100 | 50 | 70 | 150 | 25 | 25 |
| 4 | 300 | 200 | 450 | 650 | 50 | 50 |
| 5 | 750 | 550 | 1500 | >1500 | 75 | 75 |
| 6 | 1500 | 1500 | >1500 | | 100 | 100 |
| 7 | >1500 | >1500 | | | 200 | 200 |
| 8 | | | | | 350 | 350 |
| 10 | | | | | 650 | 650 |
| 11 | | | | | 900 | 900 |
| 12 | | | | | 1350 | 1500 |
| 13 | | | | | >1500 | >1500 |
| 14 | | | | | | |

Example 10

10 gram U1 treated urea and 0.5 gram salt were added to a jar and mixed by shaking the jar. Afterwards, 10 gram DAP was added and mixed in by shaking the jar.

Sample 10.1: urea
Sample 10.2: urea treated with 0.04 wt.-% U1 active ingredient
Sample 10.3: 10 g urea treated with 0.04 wt.-% U1 active ingredient, 10 g DAP

Sample 10.4: 10 g urea treated with 0.04 wt.-% U1 active ingredient, 0.5 g $Al_2(SO_4)_3$, 10 g DAP Sample 10.5: 10 g urea treated with 0.04 wt.-% U1 active ingredient, 0.5 g $FeSO_4$, 10 g DAP Sample 10.6: 10 g urea treated with 0.04 wt.-% U1 active ingredient, 0.5 g $ZnCl_2$, 10 g DAP Sample 10.7: 10 g urea treated with 0.04 wt.-% U1 active ingredient, 0.5 g $ZnSO_4$, 10 g DAP Sample 10.8: 10 g urea treated with 0.04 wt.-% U1 active ingredient, 0.5 g $CuSO_4$, 10 g DAP Sample 10.9: 10 g urea treated with 0.04 wt.-% U1 active ingredient, 0.5 g $Ca(NO_3)_2$, 10 g DAP The closed jar was then stored at room temperature in a dark place. After 14 days, the urea granules were removed from the jar and tested with the Dräger test. As shown in Table 10a and Table 10b, all tested salts reduce the effect of DAP on the degradation of U1 in fertilizer mixtures containing DAP.

TABLE 10a

| Time | Ammonia emission (ppm) | | | | |
|---|---|---|---|---|---|
| (Days) | Sample 10.1 | Sample 10.2 | Sample 10.3 | Sample 10.4 | Sample 10.5 |
| 0 | 0 | 0 | 0 | 0 | 0 |
| 1 | 5 | 0 | 0 | 0 | 0 |
| 2 | 510 | 0 | 20 | 0 | 10 |
| 3 | >1500 | 20 | 100 | 20 | 20 |
| 4 | | 30 | 400 | 50 | 50 |
| 5 | | 40 | 650 | 100 | 100 |
| 6 | | 50 | 1150 | 250 | 200 |
| 7 | | 75 | >1500 | 400 | 300 |
| 8 | | 120 | | 600 | 550 |
| 10 | | 200 | | 825 | 800 |

TABLE 10b

| Time | Ammonia emission (ppm) | | | |
|---|---|---|---|---|
| (Days) | Sample 10.6 | Sample 10.7 | Sample 10.8 | Sample 10.9 |
| 0 | 0 | 0 | 0 | 0 |
| 1 | 0 | 0 | 0 | 0 |
| 2 | 10 | 10 | 0 | 0 |
| 3 | 25 | 30 | 50 | 20 |
| 4 | 50 | 50 | 15 | 50 |
| 5 | 60 | 80 | 30 | 60 |
| 6 | 100 | 120 | 50 | 120 |
| 7 | 200 | 200 | 70 | 270 |
| 8 | 400 | 350 | 100 | 450 |
| 10 | 550 | 500 | 200 | 600 |

Particularly preferred embodiments (Embodiments) of the invention are described below:

Embodiment 1

Use of a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

in a composition A comprising (i) a (thio)phosphoric acid triamide (2) according to general formula (I)

(I)

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)akylaminocarbonyl; or R[1] and R[2] together with the nitrogen atom linking them define a 5- or 6-membered saturated or unsaturated heterocyclic radical, which optionally comprises 1 or 2 further heteroatoms selected from the group consisting of N, O, and S; and R[3], R[4], R[5], and R[6] are independently of each other selected from the group consisting of H and $C_1$-$C_4$-alkyl;

and (ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer;

to prevent decomposition of the (thio)phosphoric acid triamide (2).

Embodiment 2

A method for preventing decomposition of a (thio)phosphoric acid triamide (2) according to general formula (I)

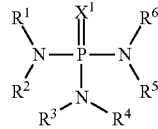

wherein $X^1$ is O or S;

R[1] is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

R[2] is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or R[1] and R[2] together with the nitrogen atom linking them define a 5- or 6-membered saturated or unsaturated heterocyclic radical, which optionally comprises 1 or 2 further heteroatoms selected from the group consisting of N, O, and S; and R[3], R[4], R[5], and R[6] are independently of each other selected from the group consisting of H and $C_1$-$C_4$-alkyl;

in a composition A comprising (i) the (thio)phosphoric acid triamide (2);

and (ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer;

by adding a cation source (1) comprising a cation $C^{m+}$ to the composition A, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl.

Embodiment 3

A mixture M comprising (i) a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

and (ii) a (thio)phosphoric acid triamide (2) according to general formula (I)

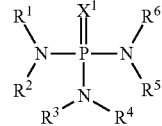

wherein $X^1$ is O or S;

R[1] is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

R[2] is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or R[1] and R[2] together with the nitrogen atom linking them define a 5- or 6-membered saturated or unsaturated heterocyclic radical, which optionally comprises 1 or 2 further heteroatoms selected from the group consisting of N, O, and S; and R[3], R[4], R[5], and R[6] are independently of each other selected from the group consisting of H and $C_1$-$C_4$-alkyl.

Embodiment 4

The mixture M according to Embodiment 3, wherein the composition further comprises (iii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer.

Embodiment 5

A granule G comprising a urea-containing fertilizer (3a) and/or a P-containing fertilizer (3b) which is preferably a NPK fertilizer, a NP fertilizer, a PK fertilizer, or a P fertilizer, wherein the granule is coated with a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

Embodiment 6

The granule G according to Embodiment 5, wherein the granule is further treated with a (thio)phosphoric acid triamide (2) according to general formula (I)

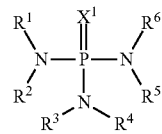

wherein

X¹ is O or S;

R¹ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

R² is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or R¹ and R² together with the nitrogen atom linking them define a 5- or 6-membered saturated or unsaturated heterocyclic radical, which optionally comprises 1 or 2 further heteroatoms selected from the group consisting of N, O, and S; and R³, R⁴, R⁵, and R⁶ are independently of each other selected from the group consisting of H and $C_1$-$C_4$-alkyl.

Embodiment 7

A composition B comprising
(i) a (thio)phosphoric acid triamide (2) according to general formula (I)

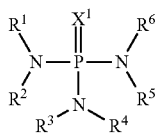
(I)

wherein

X¹ is O or S;

R¹ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

R² is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or R¹ and R² together with the nitrogen atom linking them define a 5- or 6-membered saturated or unsaturated heterocyclic radical, which optionally comprises 1 or 2 further heteroatoms selected from the group consisting of N, O, and S; and R³, R⁴, R⁵, and R⁶ are independently of each other selected from the group consisting of H and $C_1$-$C_4$-alkyl;

(ii) a fertilizer mixture (3) comprising a urea-containing fertilizer (3a) and an additional P-containing fertilizer (3b) which is preferably a NPK fertilizer, a NP fertilizer, a PK fertilizer, or a P fertilizer; and (iii) a cation source (1) comprising a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from $C_1$-$C_2$-alkyl and $C_1$-$C_2$-hydroxyalkyl;

wherein the composition B is obtainable by a process comprising the steps of (a1) treating granules comprising the urea-containing fertilizer (3a) and the (thio)phosphoric acid triamide (2) with the cation source (1);

(b1) blending the treated granules of step (a1) with granules comprising the P-containing fertilizer (3b);

or by a process comprising the steps of (a2) treating granules comprising the P-containing fertilizer (3b) with the cation source (1);

(b2) blending the treated granules of step (a2) with granules comprising the urea-containing fertilizer (3a) and the (thio)phosphoric acid triamide (2);

or by a process comprising the steps of (a3) blending granules comprising the urea-containing fertilizer (3a) and the (thio)phosphoric acid triamide (2) with granules comprising the P-containing fertilizer (3b); and (b3) treating the blend of step (a3) with the cation source (1);

or by a process comprising the steps of (a4) treating granules comprising the fertilizer mixture (3) with the (thio)phosphoric acid triamide (2); and (b4) treating the treated granules of step (a4) with the cation source (1);

or by a process comprising the steps of (a5) treating granules comprising the fertilizer mixture (3) with the cation source (1); and (b5) treating the treated granules of step (a5) with the (thio)phosphoric acid triamide (2);

or by a process comprising the steps of (a6) providing granules comprising the fertilizer mixture (3); and (b6) treating the granules of step (a6) with a—solid or liquid—mixture comprising the (thio)phosphoric acid triamide (2) and the cation source (1);

or by a process comprising the steps of (a7) providing granules comprising the fertilizer mixture (3) and the cation source (1); and (b7) treating the granules of step (a7) with the (thio) phosphoric acid triamide (2).

Embodiment 8

The use according to Embodiment 1, the method according to Embodiment 2, the mixture M according to any one of Embodiments 3 or 4, or the composition B according to any one of Embodiments 5 or 6, wherein the cation source (1) is a salt, which comprises a cation $C^{m+}$, wherein $C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, or $Ba^{2+}$.

Embodiment 9

The use according to any one of Embodiments 1 or 8, the method according to any one of Embodiments 2 or 8, the mixture M according to any one of Embodiments 3, 4 or 8, the granule G according to any one of Embodiments 5, 6 or 8, or the composition B according to any one of Embodiments 7 or 8, wherein the cation source (1) is a salt, which further comprises an anion $A^{n-}$, wherein $A^{n-}$ is $F^-$, $Cl^-$, $Br^-$, $I^-$, $SO_4^{2-}$, $NO_3^-$, or $CH_3CO_2^-$.

Embodiment 10

The use according to any one of Embodiments 1, 8 or 9, the method according to any one of Embodiments 2, 8 or 9, the mixture M according to any one of Embodiments 3, 4, 8 or 9, the granule G according to any one of Embodiments 5, 6, 8 or 9, or the composition B according to any one of Embodiments 7, 8 or 9, wherein the cation source (1) is a salt, which has a solubility of at least 33 g/L in water at a temperature of from 15° C. to 25° C.

Embodiment 11

The use according to any one of Embodiments 1, 8, 9 or 10, the method according to any one of Embodiments 2, 8, 9 or 10, the mixture M according to any one of Embodiments 3, 4, 8, 9 or 10, the granule G according to any one of Embodiments 5, 6, 8, 9 or 10, or the composition B according to any one of Embodiments 7, 8, 9 or 10, wherein the cation source (1) is a salt, which is selected from the group consisting of $Al_2(SO_4)_3$, $Fe(SO_4)$, $Fe_2(SO_4)_3$, $ZnSO_4$, $CuSO_4$, $CaSO_4$, $AlCl_3$, $FeCl_2$, $FeCl_3$, $ZnCl_2$, $CuCl_2$, $Mg(NO_3)_2$, $Ca(NO_3)_2$, $CaCl_2$, and $MgSO_4$, and is preferably $CaCl_2$ or $MgSO_4$.

Embodiment 12

The use according to any one of Embodiments 1, 8, 9, 10 or 11, the method according to any one of Embodiments 2, 8, 9, 10 or 11, the mixture M according to any one of Embodiments 3, 4, 8, 9, 10 or 11, the granule G according to any one of Embodiments 5, 6, 8, 9, 10 or 11, or the composition B according to any one of Embodiments 7, 8, 9, 10 or 11, wherein the (thio)phosphoric acid triamide (2) is N-n-butylthiophosphoric acid triamide (NBPT), N-n-propylthiophosphoric acid triamide (NPPT), or a combination thereof.

Embodiment 13

The use according to any one of Embodiments 1, 8, 9, 10, 11 or 12, the method according to any one of Embodiments 2, 8, 9, 10, 11 or 12, the mixture M according to any one of Embodiments 4, 8, 9, 10, 11 or 12, the granule G according to any one of Embodiments 5, 6, 8, 9, 10, 11 or 12, or the composition B according to any one of Embodiments 7, 8, 9, 10, 11 or 12, wherein the P-containing fertilizer (3b) causes a decomposition of the (thio)phosphoric acid triamide (2) of at least 10 wt.-% based on the total amount of the (thio)phosphoric acid triamide within 15 days at a temperature of from 20° C. to 25° C., if no cation source (1) is present.

Embodiment 14

The use according to any one of Embodiments 1, 8, 9, 10, 11, 12 or 13, the method according to any one of Embodiments 2, 8, 9, 10, 11, 12 or 13, the mixture M according to any one of Embodiments 4, 8, 9, 10, 11, 12 or 13, the granule G according to any one of Embodiments 5, 6, 8, 9, 10, 11, 12 or 13, or the composition B according to any one of Embodiments 7, 8, 9, 10, 11, 12 or 13, wherein the fertilizer (3a) is urea and/or the P-containing fertilizer (3b) is selected from the group consisting monoammonium phosphate (MAP), diammonium phosphate (DAP), calcium phosphate, super phosphate, double super phosphate, triple super phosphate (TSP), phosphate rock, ammonium polyphosphate (APP), and combinations thereof.

Embodiment 15

The use according to any one of Embodiments 1, 8, 9, 10, 11, 12, 13 or 14, the method according to any one of Embodiments 2, 8, 9, 10, 11, 12, 13 or 14, the mixture M according to any one of Embodiments 3, 4, 8, 9, 10, 11, 12, 13 or 14, the granule G according to any one of Embodiments 6, 8, 9, 10, 11, 12, 13 or 14, or the composition B according to any one of Embodiments 7, 8, 9, 10, 11, 12, 13 or 14, wherein the (thio)phosphoric acid triamide (2) is provided in combination with at least one amine (4).

Embodiment 16

The use according to any one of Embodiments 1, 8, 9, 10, 11, 12, 13, 14 or 15, the method according to any one of Embodiments 2, 8, 9, 10, 11, 12, 13, 14 or 15, the mixture M according to any one of Embodiments 3, 4, 8, 9, 10, 11, 12, 13, 14 or 15, the granule G according to any one of Embodiments 6, 8, 9, 10, 11, 12, 13, 14 or 15, or the composition B according to any one of Embodiments 7, 8, 9, 10, 11, 12, 13, 14 or 15, wherein the thio)phosphoric acid triamide (2) is provided in combination with at least one amine (4) selected from the group consisting of (4a) a polymeric polyamine; and (4b) an amine containing not more than one amino group and at least three alkoxy or hydroxy-substituted $C_2$ to $C_{12}$ alkyl groups $R^{21}$, wherein at least one of the groups $R^{21}$ is different to the other groups $R^{21}$; and (4c) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$; and (4d) an amine containing at least one saturated or unsaturated $C_8$ to $C_{40}$ alkyl group $R^{23}$; and (4e) a saturated or unsaturated heterocyclic amine which contains at least one oxygen atom as ring atom and which does not contain a further alkoxy group; and (4f) an amine having a boiling point of more than 100° C., preferably more than 150° C., more preferably more than 200° C. at ambient pressure (1 bar), and (4g) a primary amine, and (4h) a secondary amine, and (4i) a tertiary amine, (4j) an amine containing not more than one amino group and at least two alkoxy- or hydroxy-substituted $C_2$ to $C_{12}$ alkyl groups $R^{22}$, (4k) an amine containing not more than one amino group and at least three alkoxy- or hydroxy-substituted $C_2$ to $C_{12}$ alkyl groups $R^{22}$, (4l) an amine containing not more than one amino group and at least three alkoxy- or hydroxy-substituted $C_2$ to $C_{12}$ alkyl groups $R^{41}$, wherein all groups $R^{41}$ within said amine are identical, and (4m) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical, and (4n) an amine selected from the group consisting of methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether, and (4o) an amine selected from the group consisting of (L10), (L11), (L12), (L13), (L14), (L15), (L16), (L17), (L18), (L19), (L20), (L21), (L22), (L23), (L24) and (L29) as disclosed in the PCT application PCT/IB2015/059864.

Embodiment 17

The use according to any one of Embodiments 1, 8, 9, 10, 11, 12, 13, 14, 15 or 16, the method according to any one of Embodiments 2, 8, 9, 10, 11, 12, 13, 14, 15 or 16, the mixture M according to any one of Embodiments 3, 4, 8, 9, 10, 11, 12, 13, 14, 15 or 16, the granule G according to any one of Embodiments 5, 6, 8, 9, 10, 11, 12, 13, 14, 15 or 16, or the composition B according to any one of Embodiments 7, 8, 9, 10, 11, 12, 13, 14, 15 or 16, wherein the cation source (1) is used in an amount of at least 0.25 wt.-% based on the total weight of the fertilizer mixture (3), or in an amount of at least 0.5 wt.-% based on the total weight of the P-containing fertilizer (3b).

Embodiment 18

The use according to any one of Embodiments 1, 8, 9, 10, 11, 12, 13, 14, 15 or 16, the method according to any one of Embodiments 2, 8, 9, 10, 11, 12, 13, 14, 15 or 16, the mixture M according to any one of Embodiments 3, 4, 8, 9, 10, 11, 12, 13, 14, 15 or 16, the granule G according to any one of Embodiments 5, 6, 8, 9, 10, 11, 12, 13, 14, 15 or 16, or the composition B according to any one of Embodiments 7, 8, 9, 10, 11, 12, 13, 14, 15 or 16, wherein the cation source (1) is used in an amount of at most 5 wt.-% based on the total weight of the fertilizer mixture (3), or in an amount of at most 10 wt.-% based on the total weight of the P-containing fertilizer (3b).

Embodiment 19

The use according to any one of Embodiments 1, 8, 9, 10, 11, 12, 13, 14, 15 or 16, the method according to any one of Embodiments 2, 8, 9, 10, 11, 12, 13, 14, 15 or 16, the mixture M according to any one of Embodiments 3, 4, 8, 9, 10, 11, 12, 13, 14, 15 or 16, the granule G according to any one of Embodiments 5, 6, 8, 9, 10, 11, 12, 13, 14, 15 or 16, or the composition B according to any one of Embodiments 7, 8, 9, 10, 11, 12, 13, 14, 15 or 16, wherein the cation source (1) is used in an amount of at least 0.5 wt.-% based on the total weight of the fertilizer mixture (3), or in an amount of at least 1 wt.-% based on the total weight of the P-containing fertilizer (3b).

Embodiment 20

The use according to any one of Embodiments 1, 8, 9, 10, 11, 12, 13, 14, 15 or 16, the method according to any one of Embodiments 2, 8, 9, 10, 11, 12, 13, 14, 15 or 16, the mixture M according to any one of Embodiments 3, 4, 8, 9, 10, 11, 12, 13, 14, 15 or 16, the granule G according to any one of Embodiments 5, 6, 8, 9, 10, 11, 12, 13, 14, 15 or 16, or the composition B according to any one of Embodiments 7, 8, 9, 10, 11, 12, 13, 14, 15 or 16, wherein the cation source (1) is used in an amount of at most 2.5 wt.-% based on the total weight of the fertilizer mixture (3), or in an amount of at most 5 wt.-% based on the total weight of the P-containing fertilizer (3b).

The invention claimed is:
1. A method for preventing decomposition of a (thio)phosphoric acid triamide according to general formula (I)

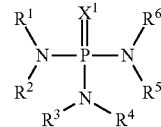

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
in a composition A comprising:
(i) the (thio)phosphoric acid triamide; and
(ii) a fertilizer mixture comprising granules of a urea-containing fertilizer and granules of an additional P-containing fertilizer, wherein the urea-containing fertilizer granules and the P-containing fertilizer granules each have a particle size within the range of 1 to 5 mm, wherein a weight ratio of the P-containing fertilizer granules to the urea-containing fertilizer granules is at least 0.4;
by adding a cation source comprising a cation $C^{m+}$ to the composition A, wherein
$C^{m+}$ is $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, $Ba^{2+}$, or a quaternary ammonium group comprising at least three groups selected from the group consisting of $C_1$-$C_2$-alkyl and $C_1$-$C_2$-hydroxyalkyl;
wherein the cation source is a zeolite, an ion exchange resin, or a salt comprising a cation selected from the group consisting of $Ca^{2+}$, $Mg^{2+}$, $Li^+$, $Fe^{2+}$, $Fe^{3+}$, $Al^{3+}$, $Ag^+$, $Cu^{2+}$, $Hg^{2+}$, $Pb^{2+}$, and $Ba^{2+}$ and an anion selected from the group consisting of $F^-$, $Cl^-$, $Br^-$, $I^-$, $SO_4^{2-}$, and $CH_3CO_2^-$.

2. The method according to claim 1, wherein the additional P-containing fertilizer is selected from the group consisting of an NPK fertilizer, an NP fertilizer, a PK fertilizer, and a P fertilizer.

3. The method according to claim 1, wherein the salt is selected from the group consisting of $CaCl_2$ and $MgSO_4$.

* * * * *